(12) United States Patent
Sarwat et al.

(10) Patent No.: US 11,593,479 B1
(45) Date of Patent: Feb. 28, 2023

(54) SYSTEMS AND METHODS FOR DETECTING AN ATTACK ON A BATTERY MANAGEMENT SYSTEM

(71) Applicants: Arif I. Sarwat, Miami, FL (US); Asadullah Khalid, Miami, FL (US)

(72) Inventors: Arif I. Sarwat, Miami, FL (US); Asadullah Khalid, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/664,936

(22) Filed: May 25, 2022

(51) Int. Cl.
  *G06F 21/55* (2013.01)
  *G01R 31/382* (2019.01)
  *G01R 31/392* (2019.01)
  *G01R 31/396* (2019.01)

(52) U.S. Cl.
  CPC ......... *G06F 21/552* (2013.01); *G01R 31/382* (2019.01); *G01R 31/392* (2019.01); *G01R 31/396* (2019.01); *G06F 2221/034* (2013.01)

(58) Field of Classification Search
  CPC ............ G06F 21/552; G06F 2221/034; G01R 31/392; G01R 31/396; G01R 31/382
  USPC .................................................. 324/425–433
  See application file for complete search history.

(56) References Cited

U.S. PATENT DOCUMENTS

| | | | |
|---|---|---|---|
| 2020/0233956 A1* | 7/2020 | Wang | G06F 21/554 |
| 2020/0282854 A1* | 9/2020 | Liu | B60L 53/67 |

* cited by examiner

*Primary Examiner* — Lee E Rodak
*Assistant Examiner* — Trung Q Nguyen
(74) *Attorney, Agent, or Firm* — Saliwanchik, Lloyd & Eisenschenk

(57) ABSTRACT

Systems and methods for detecting and/or identifying an attack on a battery management system (BMS) or a battery system. The voltage and/or state of charge (SOC) of the BMS or battery system can be monitored, and one or more datasets can be obtained. A principal component analysis (PCA) based unsupervised k-means approach can be applied on the one or more datasets to monitor for irregularities that indicate an attack.

20 Claims, 22 Drawing Sheets

| ΔV Setting | Resulting ΔV value | Δe | Convergence Time (in seconds) |
|---|---|---|---|
| Normal Setting | 0.05 | - | 2042 |
| Attack Scenario 1 | 0.1 | 0.05 | 4084 |
| Attack Scenario 2 | 0.2 | 0.15 | 6168 |
| Attack Scenario 3 | 0.3 | 0.25 | 8252 |
| Attack Scenario 4 | 3.5 | 3.45 | 10329 |

FIG. 7

SYSTEMS AND METHODS FOR DETECTING AN ATTACK ON A BATTERY MANAGEMENT SYSTEM

BACKGROUND

Microgrids (MGs) including distributed generators, and energy storage systems as the key cyber-physical components, are increasingly being implemented globally. Within this cyber-physical power grid (CPPG) space, three hierarchical categorizations exist: the device layer; the communication layer; and the supervisory layer. The device layer is responsible for collecting analog data through physical sensors. The supervisory layer is responsible for monitoring MG conditions and decision-making. The communication layer is responsible for the information exchange between the other two layers. In a MG system, a false data injection attack, or a parameter manipulation attack, could be carried out on any of the layers because of the presence of a wide variety of components. One of the key MG components is the battery energy storage system (BESS).

A BESS typically includes a system controller with an energy management system interface, battery modules, and a battery management system (BMS) with charge balancing electronics. The BMS allows monitoring of cell voltages, current, and temperatures. It also keeps the cell voltages within safe operating ranges (by balancing them) to increase the durability of each battery rack containing the module.

BRIEF SUMMARY

Embodiments of the subject invention provide novel and advantageous systems and methods for detecting and/or identifying an attack (e.g., a cyber attack or cyber intrusion) on a battery management system (BMS) or a battery system (e.g., of an electric vehicle or microgrid (MG)). The voltage and/or state of charge (SOC) of the BMS or battery system can be monitored, and/or a voltage dataset and/or an SOC dataset can be obtained. A principal component analysis (PCA) based unsupervised k-means approach can be applied on the voltage dataset and/or the SOC dataset to monitor for irregularities that indicate an attack.

In an embodiment, a system for detecting a cyber attack on a BMS (or battery system) can comprise: a processor in operable communication with the BMS; and a (non-transitory) machine-readable medium in operable communication with the processor and the BMS, and having instructions stored thereon that, when executed by the processor, perform the following steps: monitoring (e.g., by the processor) data comprising a first parameter of the BMS; extracting (e.g., by the processor) a first dataset of the first parameter; performing (e.g., by the processor) a PCA based unsupervised k-means process on the first dataset to detect a first convergence period of the first dataset; comparing (e.g., by the processor) the first convergence period to a first expected convergence period for the first parameter based on a first buffer value of the BMS (e.g., $\Delta V$); if the first convergence period is greater than the first expected convergence period by more than a first preset margin amount (e.g., an acceptable variance and/or error), providing (e.g., by the processor) an alert that the BMS is under attack; and if the first convergence period is not greater than the first expected convergence period by more than the first preset margin amount, allowing (e.g., by the processor) the BMS to continue normal operation. The first parameter can be, for example, voltage or SOC. The instructions when executed can perform the following steps: monitoring (e.g., by the processor) a second parameter of the BMS; extracting (e.g., by the processor) a second dataset of the second parameter; performing (e.g., by the processor) the PCA based unsupervised k-means process on the second dataset to detect a second convergence period of the second dataset; comparing (e.g., by the processor) the second convergence period to a second expected convergence period for the first parameter based on a second buffer value of the BMS; if the second convergence period is greater than the second expected convergence period by more than a second preset margin amount (e.g., an acceptable variance and/or error), providing (e.g., by the processor) the alert that the BMS is under attack; and if the second convergence period is not greater than the second expected convergence period by more than the second preset margin amount, allowing (e.g., by the processor) the BMS to continue normal operation. The second parameter can be, for example, voltage or SOC. The first buffer value of the BMS and the second buffer value of the BMS can be the same or can be different. The PCA based unsupervised k-means process can comprise min-max scaling to [0,1] all data in the first dataset and/or all data in the second dataset (if present). The PCA based unsupervised k-means process can comprise extracting a mean and a variance of features of the first dataset and/or the second dataset (if present). The first dataset can have millisecond resolution and/or the second dataset (if present) can have millisecond resolution. The instructions when executed can further perform (e.g., by the processor) a balancing algorithm on the BMS, and the balancing algorithm can use a top balancing mode where battery cells are equalized at a highest safe voltage or a bottom balancing mode where the battery cells are equalized at a lowest safe voltage. The system can comprise the BMS itself and/or battery cells managed by the BMS.

In another embodiment, a method for detecting a cyber attack on a BMS can comprise: monitoring (e.g., by a processor in operable communication with the BMS) data comprising a first parameter of the BMS; extracting (e.g., by the processor) a first dataset of the first parameter; performing (e.g., by the processor) a PCA based unsupervised k-means process on the first dataset to detect a first convergence period of the first dataset; comparing (e.g., by the processor) the first convergence period to a first expected convergence period for the first parameter based on a first buffer value of the BMS; if the first convergence period is greater than the first expected convergence period by more than a first preset margin amount, providing (e.g., by the processor) an alert that the BMS is under attack; and if the first convergence period is not greater than the first expected convergence period by more than the first preset margin amount, allowing (e.g., by the processor) the BMS to continue normal operation. The first parameter can be, for example, voltage or SOC. The method can further comprise: monitoring (e.g., by the processor) a second parameter of the BMS; extracting (e.g., by the processor) a second dataset of the second parameter; performing (e.g., by the processor) the PCA based unsupervised k-means process on the second dataset to detect a second convergence period of the second dataset; comparing (e.g., by the processor) the second convergence period to a second expected convergence period for the first parameter based on a second buffer value of the BMS; if the second convergence period is greater than the second expected convergence period by more than a second preset margin amount (e.g., an acceptable variance and/or error), providing (e.g., by the processor) the alert that the BMS is under attack; and if the second convergence period is not greater than the second expected convergence period by more than the second preset margin amount, allowing (e.g., by the processor) the BMS to continue normal operation. The second parameter can be, for example, voltage or SOC. The first buffer value of the BMS and the second buffer value of the BMS can be the same or can be different. The PCA based unsupervised k-means process can comprise min-max scaling to [0,1] all data in the first dataset and/or all data in the second dataset (if present). The PCA based unsupervised k-means process can comprise extracting a mean and a variance of features of the first dataset and/or the second dataset (if present). The first dataset can have millisecond resolution and/or the second dataset (if present) can have millisecond resolution. The method can further comprise performing (e.g., by the processor) a balancing algorithm on the BMS, and the balancing algorithm can use a top balancing mode where battery cells are equalized at a highest safe voltage or a bottom balancing mode where the battery cells are equalized at a lowest safe voltage.

BRIEF DESCRIPTION OF DRAWINGS

FIG. 7 shows a table of $\Delta V$ values and convergence times for a normal setting and four different attack scenarios.

DETAILED DESCRIPTION

Embodiments of the subject invention provide novel and advantageous systems and methods for detecting and/or identifying an attack (e.g., a cyber attack or cyber intrusion) on a battery management system (BMS) or a battery system (e.g., of an electric vehicle or microgrid (MG)). The voltage and/or state of charge (SOC) of the BMS or battery system can be monitored, and/or a voltage dataset and/or an SOC dataset can be obtained. A principal component analysis (PCA) based unsupervised k-means approach can be applied on the voltage dataset and/or the SOC dataset to monitor for irregularities that indicate an attack.

Systems and methods of embodiments of the subject invention can detect and/or identify an attack and can create an alert (e.g., electronic alert) that can prevent or inhibit the attack (and/or daisy-chained attacks), thereby protecting the battery cells (e.g., from unwanted accelerated degradations). If not prevented or inhibited, such an attack may otherwise attempt to manipulate the acceptable voltage buffer values between cells of the BMS or battery system.

Allowable voltage difference (buffer) between cells in a battery module can be defined in the balancing algorithm of the BMS (e.g., by the manufacturer) and can be updated to reduce or increase the balancing time. When this buffer is slowly increased, the battery module faces degradation which is undetectable unless it exceeds the safe operation threshold, at which point it is detected either by the capacitor bank on the power conversion unit (PCS; can also be referred to as a power conversion system) side or by the system controller. This parameter can thus be exposed to an attack, which if prolonged for a longer duration, can ultimately reduce the overall lifetime of the battery. A BMS algorithm can be monitored and a voltage dataset and/or an SOC dataset can be obtained. A PCA based unsupervised k-means approach (or algorithm) can be applied on the voltage and SOC datasets to detect and/or identify irregularities that indicate an attack (e.g., by considering the convergence (balancing) periods of the voltage and/or SOC). As discussed later herein, a BMS algorithm was simulated under normal and manipulated voltage buffer values (for four different types of attacks, referred to herein as "attack scenario 1", "attack scenario 2", "attack scenario 3", and "attack scenario 4"). In order to effectively detect the voltage and SOC convergence (balancing) periods, a PCA based unsupervised k-means approach was applied on the voltage and SOC datasets and compared with a standalone k-means approach, with the results indicating that the PCA-based k-means approach outperforms the standalone approach.

Figures 1A, 1B, 1C:
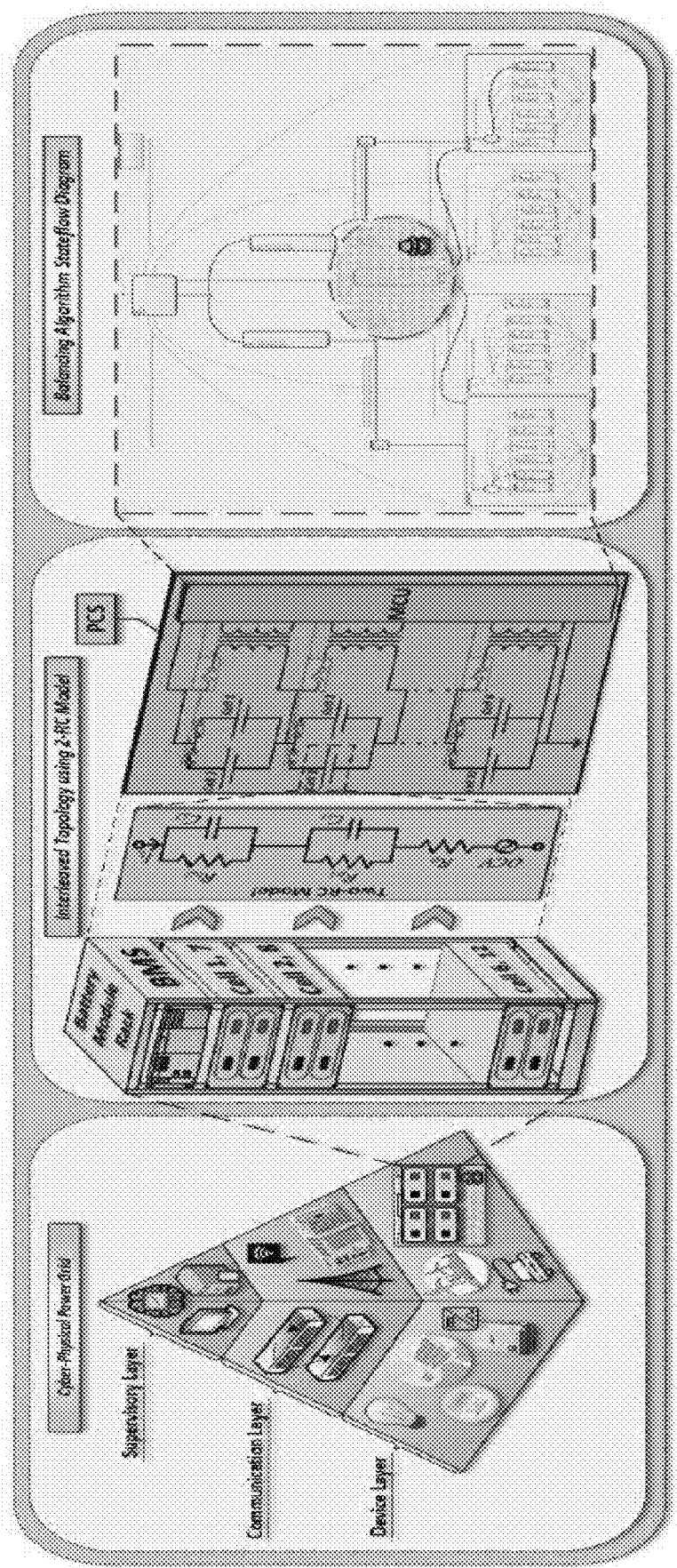
FIG. 1A shows a schematic view of a cyber-physical power grid.
FIG. 1B shows a schematic view of a model battery management system (BMS) and its architecture with two-resistor-capacitor (2-RC) model simulated cells, according to an embodiment of the subject invention.
FIG. 1C shows a schematic view of a balancing algorithm under attack, simulated with MATLAB/Simulink Stateflow decision logic, according to an embodiment of the subject invention.

FIG. 1A shows a schematic view of a cyber-physical power grid (CPPG), which includes three hierarchical categorizations: a device layer; a communication layer; and a supervisory layer. The device layer is responsible for collecting analog data through physical sensors; the supervisory layer is responsible for monitoring MG conditions and decision-making; and the communication layer is responsible for information exchange between the other device layer and the supervisory layer. Because the BMS module lies at the bottom (device layer) of the hierarchical chain, its operation is dependent on the commands received from the system controller. Depending on operational requirements, the system controller provides commands from the supervisory layer to charge/discharge and balance the batteries within certain ranges. These commands follow a defined decision logic/sequence, which if not cyber-secured, can be the key point of interest of a cyber-attack. The PCS, usually a bi-directional inverter, can interface with the battery bank (including battery module racks with individual BMSs) via a capacitor bank. If the voltage across the capacitor bank, reflected from the battery bank, is not within a pre-defined safe operational range, the PCS trips and thereby protects the rest of the system. The supervisory layer can also set an acceptable range within which the resulting voltages of each cell in a battery module (in a battery bank) are within a certain voltage buffer ($\Delta V$) range, which is usually in the millivolts (mV) range. If this $\Delta V$ parameter is manipulated within a mV range in related art systems, it does not trip the PCS but instead results in an anomalous balancing operation of the battery. Such an operation when continued for a long period of time can inadvertently degrade the battery. Hence, embodiments of the subject invention provide attack identification mechanisms (AIMs), based on the varying convergence periods obtained by manipulating the $\Delta V$ parameter, using a PCA based k-means clustering (unsupervised learning) technique. Embodiments provide top and bottom balancing (equalization) algorithms for a battery pack with interleaved connections and apply unsupervised k-means clustering techniques using principal components onto the balancing data. In the examples, the clustering performance of the algorithms are evaluated in comparison with that of a standalone unsupervised k-means model, based on various attack scenarios.

Within the device layer of the CPPG space in a MG environment, related art anomaly detection and fault diagnosis works focus on either false data injection (FDI) into a photovoltaic (PV) array output, the set-point manipulation of a grid-following inverter, or voltage sensor data manipulation in a BESS. For instance, a scenario can be analyzed where a production meter is subject to FDI resulting in a false increase in the generation power. Also, the impact of real and reactive power set-point manipulations can be analyzed. Similarly, multiple fault scenarios can be created by manipulating voltage sensor data. Related art methods utilize either an artificial neural network (ANN) based AIM or a supervised learning-based AIM. Implementation of an ANN for classification purposes introduces computational complexity. In addition, the supervised learning technique requires an accurate understanding of the labels (attack regions) for classification, thus limiting the applicability upon introduction of a new variant of attack on the same parameter. No known related art system or method focuses on the manipulation of, or an attack on, a specific parameter defined within an algorithm of a BMS. In embodiments of the subject invention use PCA to filter components to be fed into a k-means model to improve unsupervised clustering accuracy.

There are varying lithium (Li)-ion battery simulation models currently available, including the SAFT RC model, the Rint model, the Linear model, and several Thevenin models. However, the m-RC (where m is an integer) based models stand out in terms of parameter estimation accuracy. Johnson (Battery performance models in advisor, Journal of power sources, vol. 110, no. 2, pp. 321-329, 2002; which is hereby incorporated by reference herein in its entirety) provides a comprehensive list of existing battery models along with dynamicity, indicated by the number of variable functions within them. In many embodiments of the subject invention, an m-RC based model can be used, where m is 2. Li-ion cells (e.g., 3.6 Volt (V) 2.9 Ampere-hour (Ah) Li-ion cells can be modeled and simulated using the steps mentioned in Khalid et al. (Simulation-based analysis of equalization algorithms on active balancing battery topologies for electric vehicles, in Proceedings of the Future Technologies Conference, Springer, 2019, pp. 708-728; which is hereby incorporated by reference herein in its entirety), which are based on the Verband der Automobilindustrie (VDA) method (see also, Schweiger et al., Comparison of several methods for determining the internal resistance of lithium ion cells, Sensors, vol. 10, no. 6, pp. 5604-5625, 2010; which is hereby incorporated by reference herein in its entirety). The cells can be modeled in a 6s2p stack to form a module in an interleaved manner, as shown in FIG. 1B (see also Plett et al., Simulating battery packs comprising parallel cell modules and series cell modules," in Proc. of EVS, 2009, pp. 1-17; and Sarwat et al., Battery module performance analysis under varying interconnection topology for electric vehicles, in 2019 IEEE Transportation Electrification Conference (ITEC-India), 2019, pp. 1-5; both of which are hereby incorporated by reference herein in their entireties).

Figure 2:
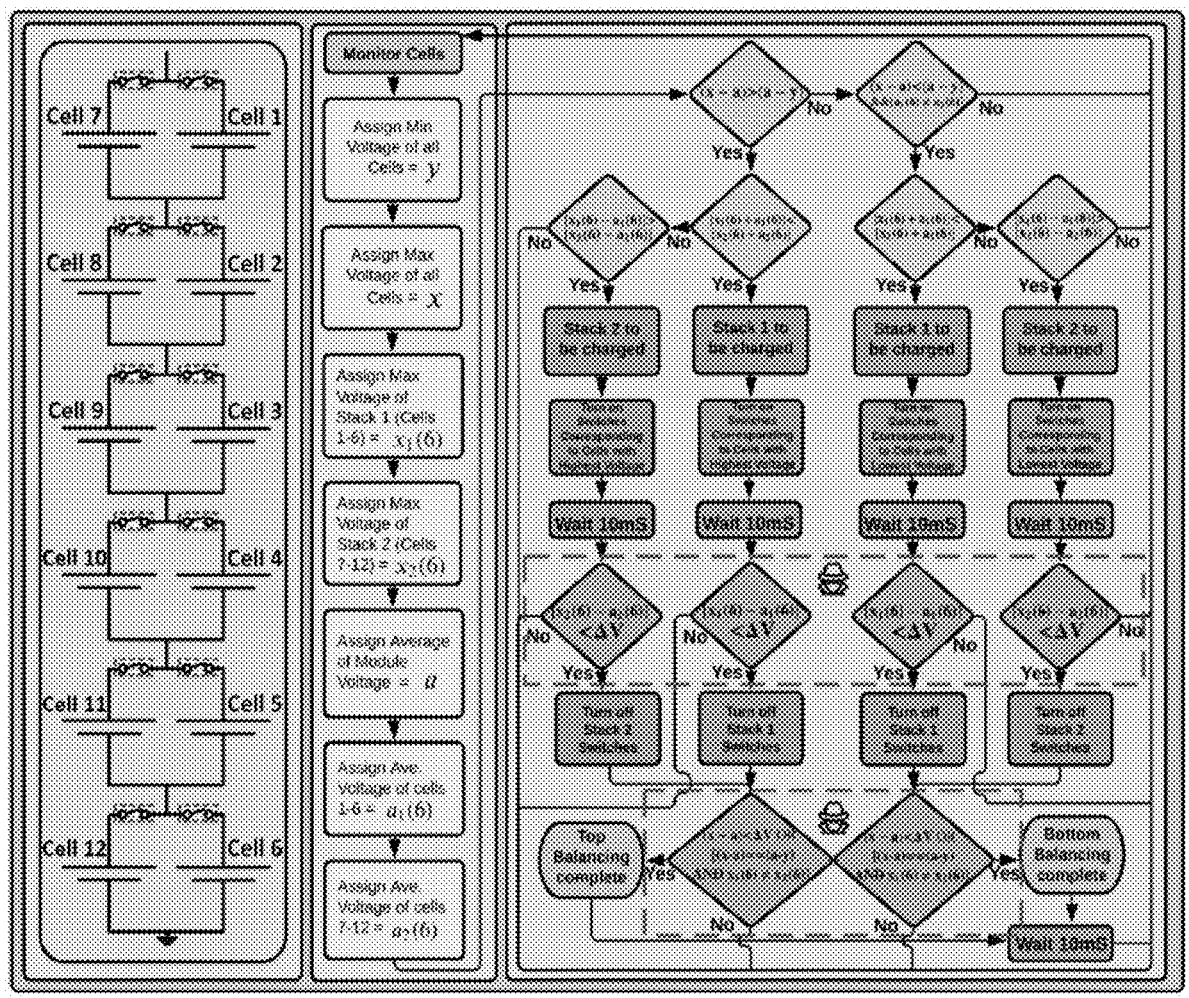
FIG. 2 shows a logical sequence flowchart of a Stateflow diagram, according to an embodiment of the subject invention.

FIG. 1C shows an algorithm incorporated in the battery module's BMS, according to an embodiment of the subject invention, and in FIG. 1C it is shown in the form of Stateflow (in MATLAB/Simulink). FIG. 2 shows a logical sequence flowchart of the algorithm incorporated in the battery module's BMS. In the implemented 6s2p interleaved topology module, cells 1-6 can be placed in stack 1, and cells 7-12 can be placed in stack 2.

Referring to FIG. 2, the algorithm can assume that voltage monitoring sensors are placed on each cell, stack, and module. These sensors store the minimum and maximum module voltages, average module voltage, maximum voltages of each stack, and average voltages of each stack. The algorithm can balance the cells in either top balancing mode (cells equalized at the highest possible safe voltage) or bottom balancing mode (cells equalized at the lowest possible safe voltage). Under normal conditions, the maximum permissible voltage difference ($\Delta V$) between any two cells in the module is set as 0.05 V. The top balancing mode initiates when the deviation of maximum module voltage (x) from average module voltage (a) is higher than the deviation of average module voltage from that minimum module voltage (y); that is, (x−a)>(a−y). The bottom balancing mode initiates when (x−a)<(a−y) and when average stack voltages of respective stacks are not equal. The assignment of the variables x, a, and y is also shown in FIG. 2.

This can be followed by comparisons of the $x(6)\pm a(6)$ values of both stacks. The $x(6)-a(6)$ values would remain constant until $\Delta V$ within any cell pair deviates from 0.05 V. The $x(6)+a(6)$ would increment with the maximum voltage value, x(6), of a stack. The average value, a(6), is added to make the resulting values prominent, as the voltages tend to drop down to low decimal values in case of a failure and at times are undetectable due to sensor error thresholds. Based on the conditions satisfied, the applicable stack gets charged in an active equalization manner, either using the highest voltage or lowest voltage cells within the stack once their corresponding switches are opened. A 10 millisecond (ms) period is then allocated for the cells and sensors to re-verify whether the voltages of the cells in a stack are within the $\Delta V$ range or not. In order to further strengthen the algorithm, a final check on whether the voltage of the cells are within the $\Delta V$ or not can be performed.

Figure 3A:
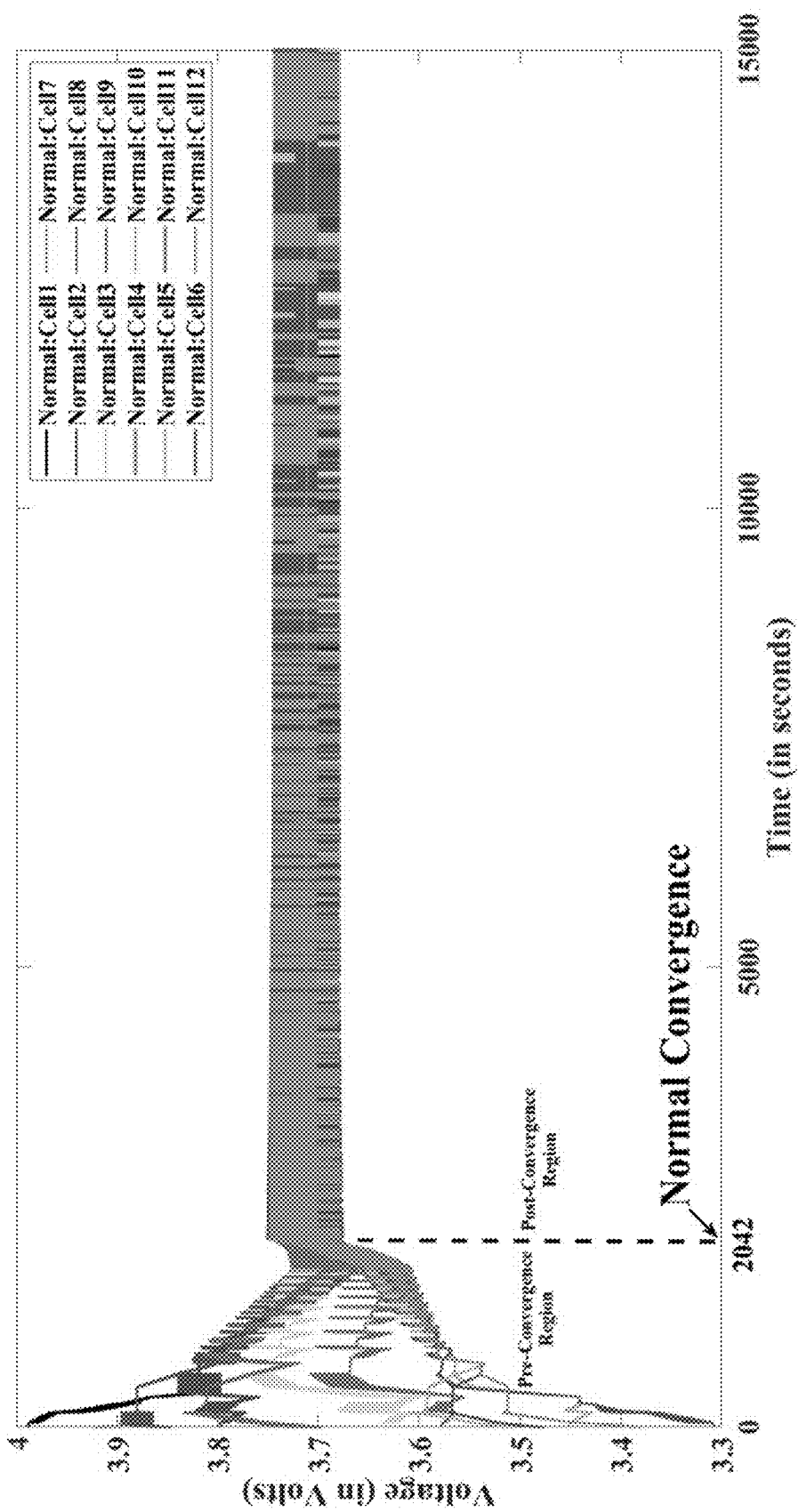
FIG. 3A shows a plot of voltage (in Volts (V)) versus time (in seconds (s)) showing a distributed interleaved model equalization plot for voltage convergence under a normal voltage buffer ($\Delta V$) setting.
Figure 3B:
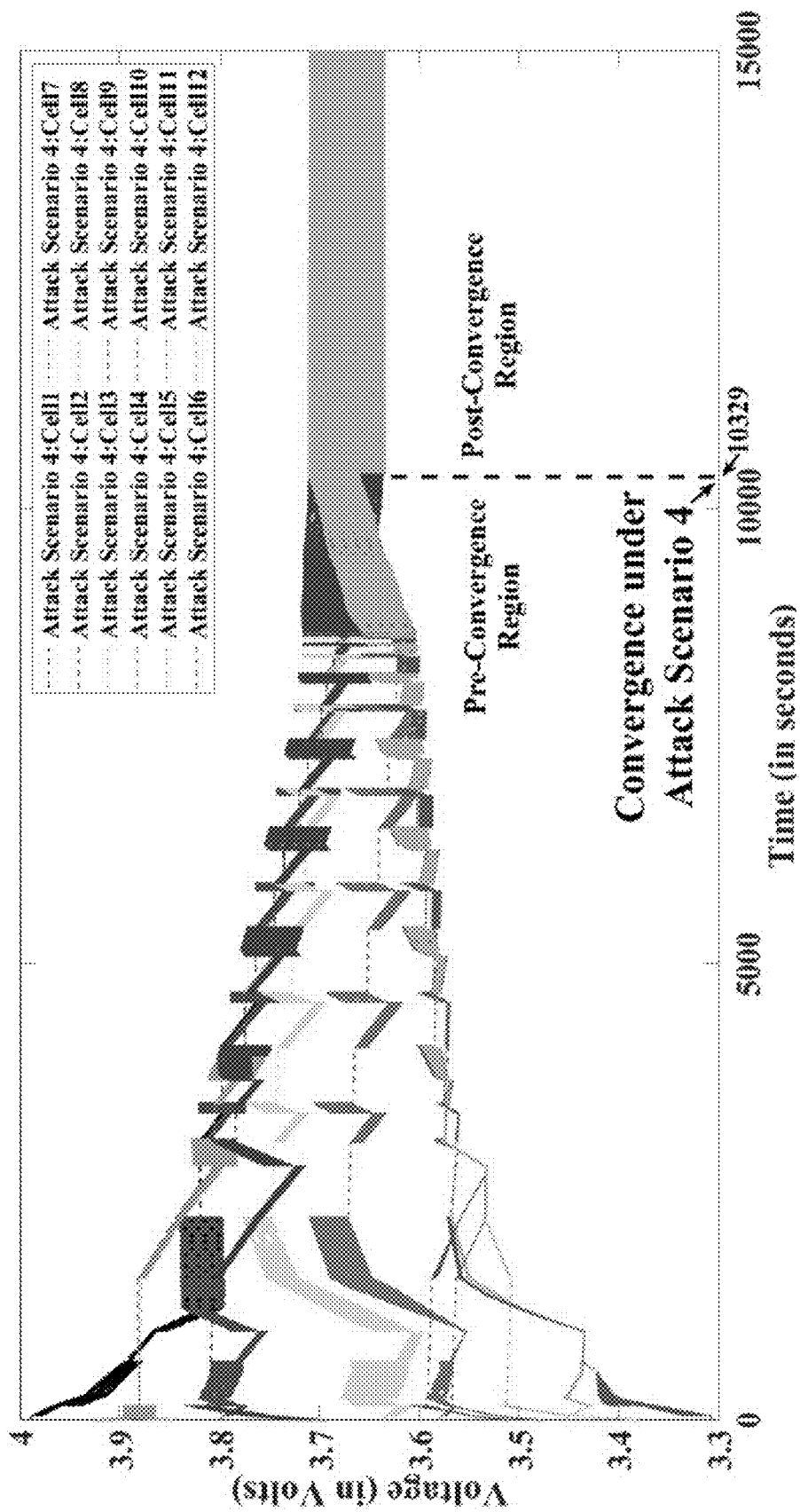
FIG. 3B shows a plot of voltage (in V) versus time (in s) showing a distributed interleaved model equalization plot for voltage convergence under an attack scenario's (attack scenario 4) $\Delta V$ setting.
Figure 3C:
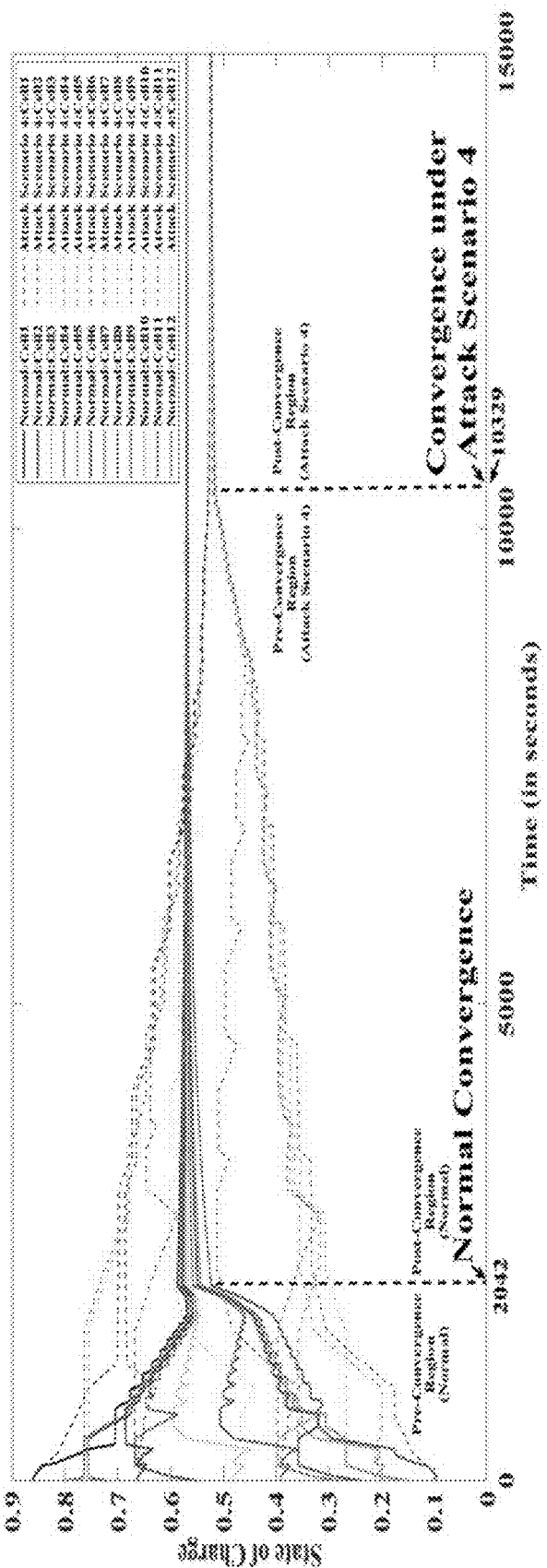
FIG. 3C shows a plot of state of charge (SOC) versus time (in s) showing SOC convergence results for a normal $\Delta V$ setting and under an attack scenario's (attack scenario 4) $\Delta V$ setting.

At this stage, the voltage and consequently the SOC plots can converge within a voltage and SOC range, respectively. This convergence stage waits for 10 ms to store the result in a register, and then returns back to the voltage monitoring process. The time at which this convergence occurs should be as low as possible. The resulting convergence data has a resolution of 1 ms. In order to visualize the equalization, data points (time-scaled to seconds) for voltage and SOC convergence plots under normal operation are shown in FIGS. 3A and 3C, respectively.

The system controller usually has a register address allocated to each battery module to set the $\Delta V$ value. If the $\Delta V$ value is large enough such that the voltage limits reflected on the PCS are violated, the protection system trips the breakers disconnecting the battery bank. If there are small variations in this value in such a manner that the protection circuit does not trip, the health of the battery module gets impacted and it would deteriorate the battery ahead of the manufacturer's recommended timeline. This scenario is emulated by injecting $\Delta e$ in the normal $\Delta V$ value in the following manner:

$$\Delta V|_{Attack\ Scenario} \Delta V|_{Normal} + \Delta e \qquad (1)$$

where $\Delta e \in$ attack values. The normal and attack values for each scenario are tabulated in the table in FIG. 7, and the corresponding equalization plots for the normal scenario and attack scenario 4, indicating the resultant impact on convergence times for both voltage and SOC parameters, are shown in FIGS. 3A, 3B, and 3C.

The equalization (pre-convergence, convergence, and post-convergence) data obtained for both voltage and SOC, can be Min-Max scaled to [0,1]. This can be performed for all (e.g., one normal and all (e.g., four) attack) scenarios. In order to learn the feature trend and prevent or inhibit bias towards a certain feature, the mean and variance of the features of the data can be extracted.

For each scenario, the scaled data matrix including ms equalization data, $(x_1, x_2, x_n)$, and centered data matrix, $Y=(y_1, y_2, \ldots, y_n)$, where $y_i = x_i - \mu$ and $\mu = \sum_{i=1}^{n} x_i / n$, $i \in \{1, 2, \ldots, n\}$ can be used to compute the covariance matrix, $YY^T$, shown in Equation (2). Here, $n = 15 \times 10^6$ ms.

$$YY^T = \sum_{i=1}^{n} y_i y_i^T \qquad (2)$$

Figure 4A:
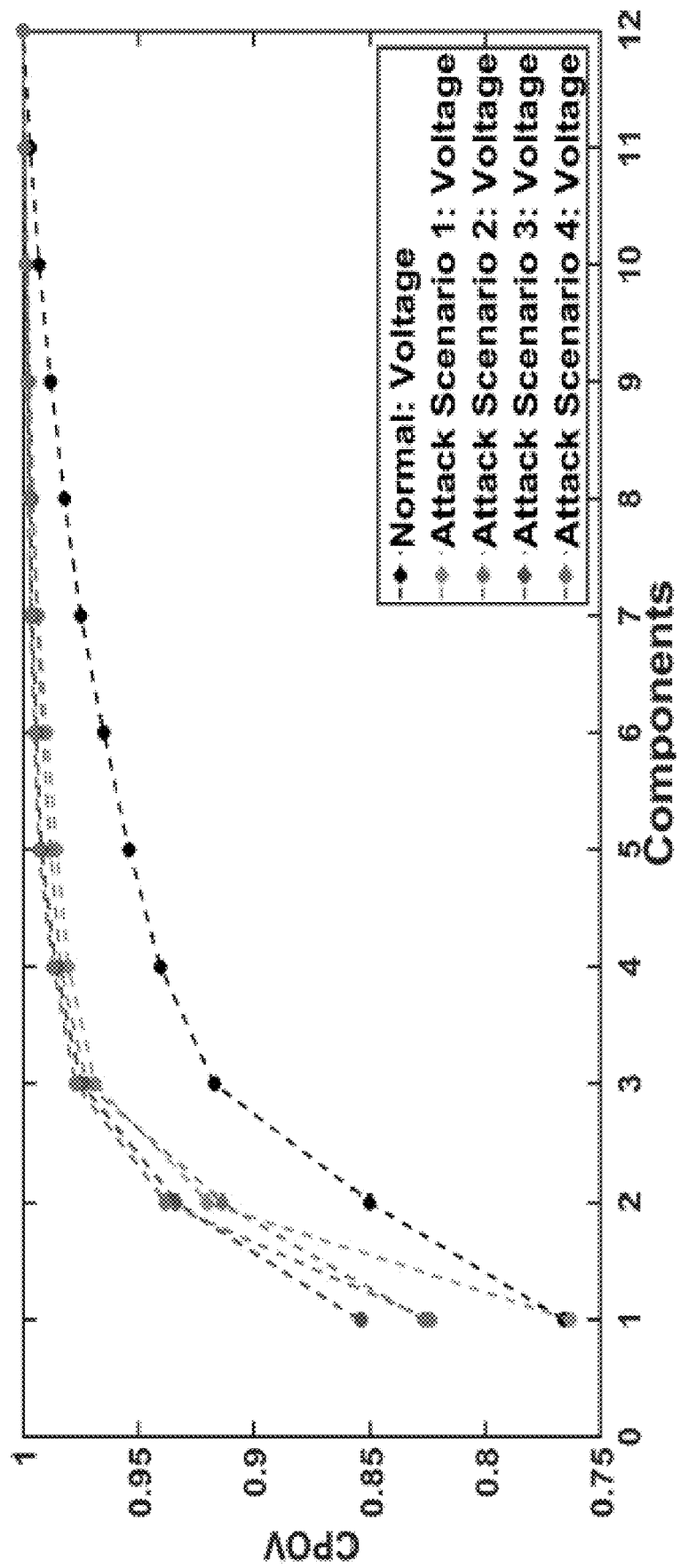
FIG. 4A shows a plot of cumulative proportion of variance (CPOV) versus components showing a voltage dataset plot for a normal scenario and four attack scenarios. The curve with the lowest CPOV value at component 4 is for the normal scenario; the curve of the remaining four that has the lowest CPOV value at component 1 is for attack scenario 1; and the curve of the remaining three that has the highest CPOV value at component 1 is for attack scenario 3.
Figure 4B:
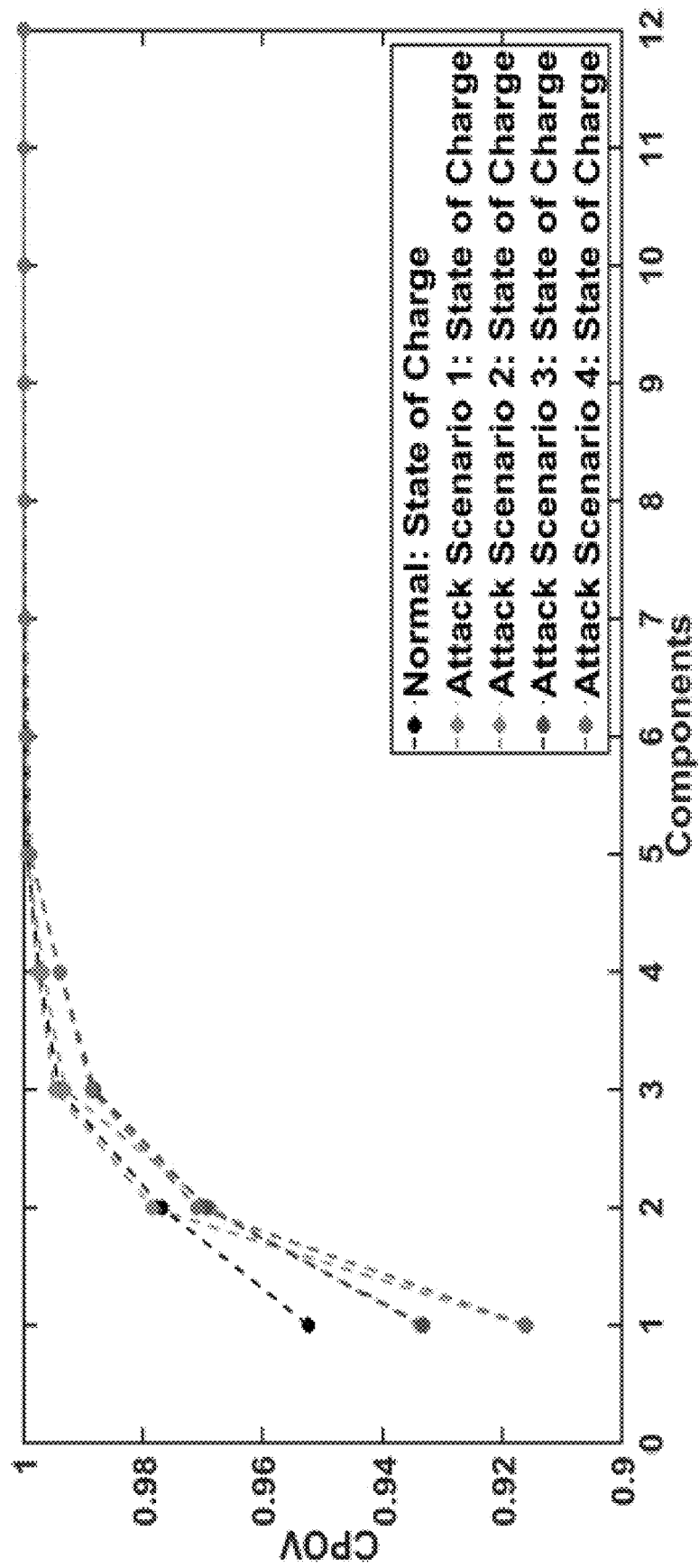
FIG. 4B shows a plot of CPOV versus components showing a SOC dataset plot for a normal scenario and four attack scenarios. The curve with the highest CPOV value at component 1 is for the normal scenario; the two curves with the lowest CPOV value at component 1 are for attack scenario 1 and attack scenario 4; and the two curves with the CPOV value of around 0.938 at component 1 are for attack scenario 2 and attack scenario 3.

The principal eigenvectors of Equation (2) give the principal directions of the centered matrix, Y. The transpose of Equation (2), $Y^TY$, gives the Gram matrix whose eigenvectors represent how much each data point is represented by the components, relative to the dataset. These representations are the projected values of datapoints and are termed as principal components. At this stage, the dimensionality reduction algorithm, PCA, reduces the dimension of the dataset such that the relationship between datapoints is preserved. This is performed by measuring the percentage cumulative variance or cumulative proportion of variance (CPOV) of the data projected onto the principal component's axis. CPOV of an $\alpha^{th}$ principal component is the sum of the variances of all the $\alpha$ principal components. Plots of CPOV versus components for voltage and SOC datasets are shown in FIGS. 4A and 4B, respectively.

Figure 4C:
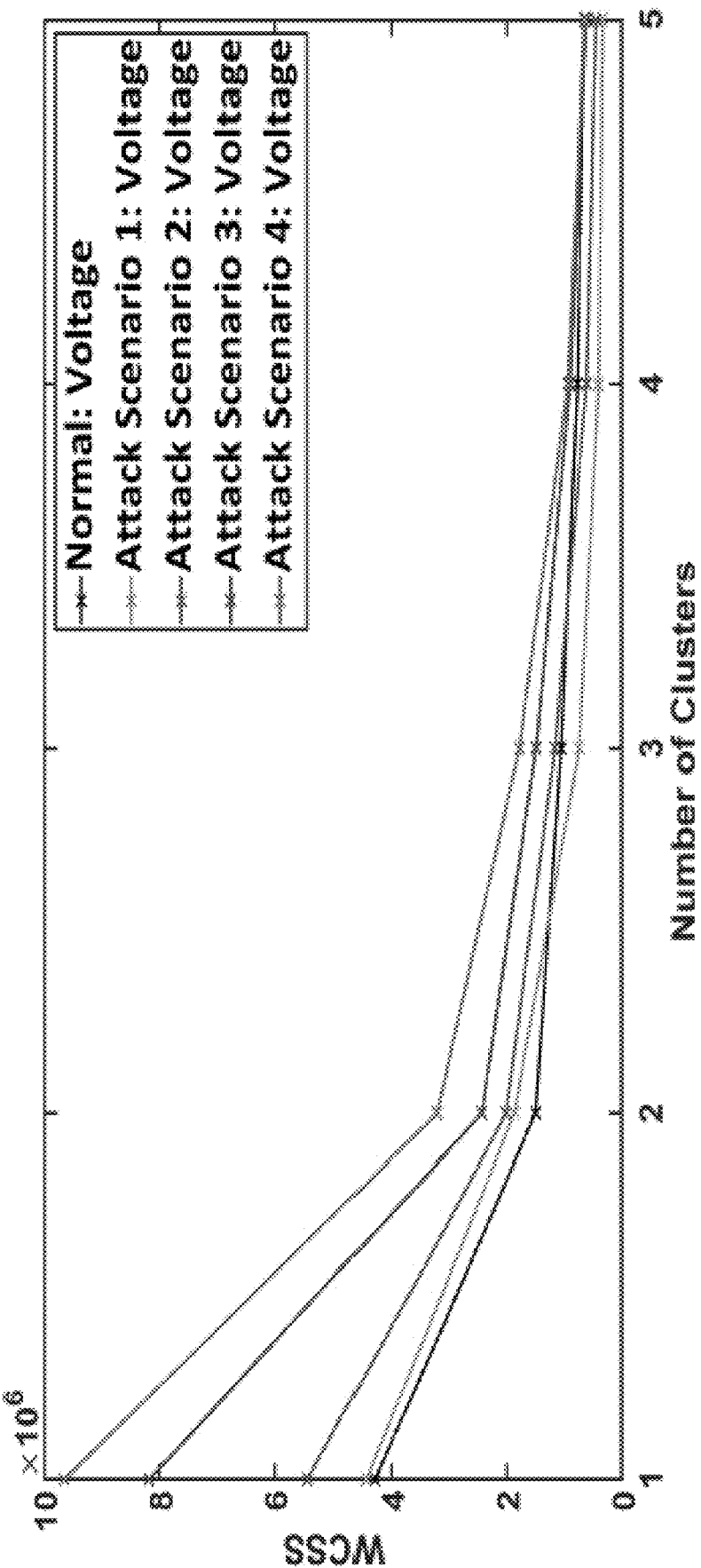
FIG. 4C shows a plot of within-cluster-sum-of-squares (WCSS) versus components showing a voltage dataset plot for a normal scenario and four attack scenarios. The curve with the lowest WCSS value at component 2 is for the normal scenario; the curve with the second-lowest WCSS value at component 2 is for attack scenario 1; the curve with the third-lowest WCSS value at component 2 is for attack scenario 2; the curve with the fourth-lowest WCSS value at component 2 is for attack scenario 3; and the curve with the highest WCSS value at component 2 is for attack scenario 4.
Figure 4D:
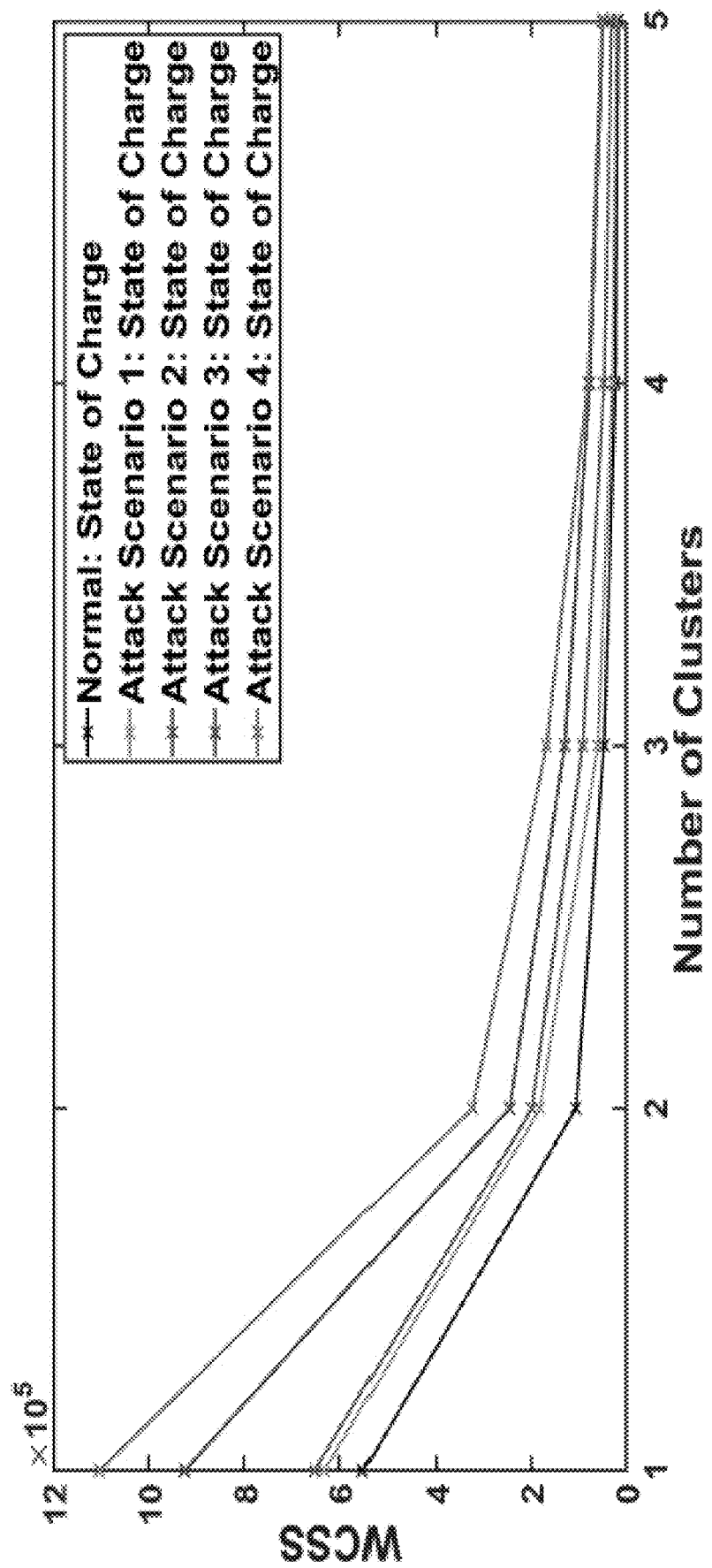
FIG. 4D shows a plot of WCSS versus components showing a SOC dataset plot for a normal scenario and four attack scenarios. The curve with the lowest WCSS value at component 2 is for the normal scenario; the curve with the second-lowest WCSS value at component 2 is for attack scenario 1; the curve with the third-lowest WCSS value at component 2 is for attack scenario 2; the curve with the fourth-lowest WCSS value at component 2 is for attack scenario 3; and the curve with the highest WCSS value at component 2 is for attack scenario 4.
Figure 5A:
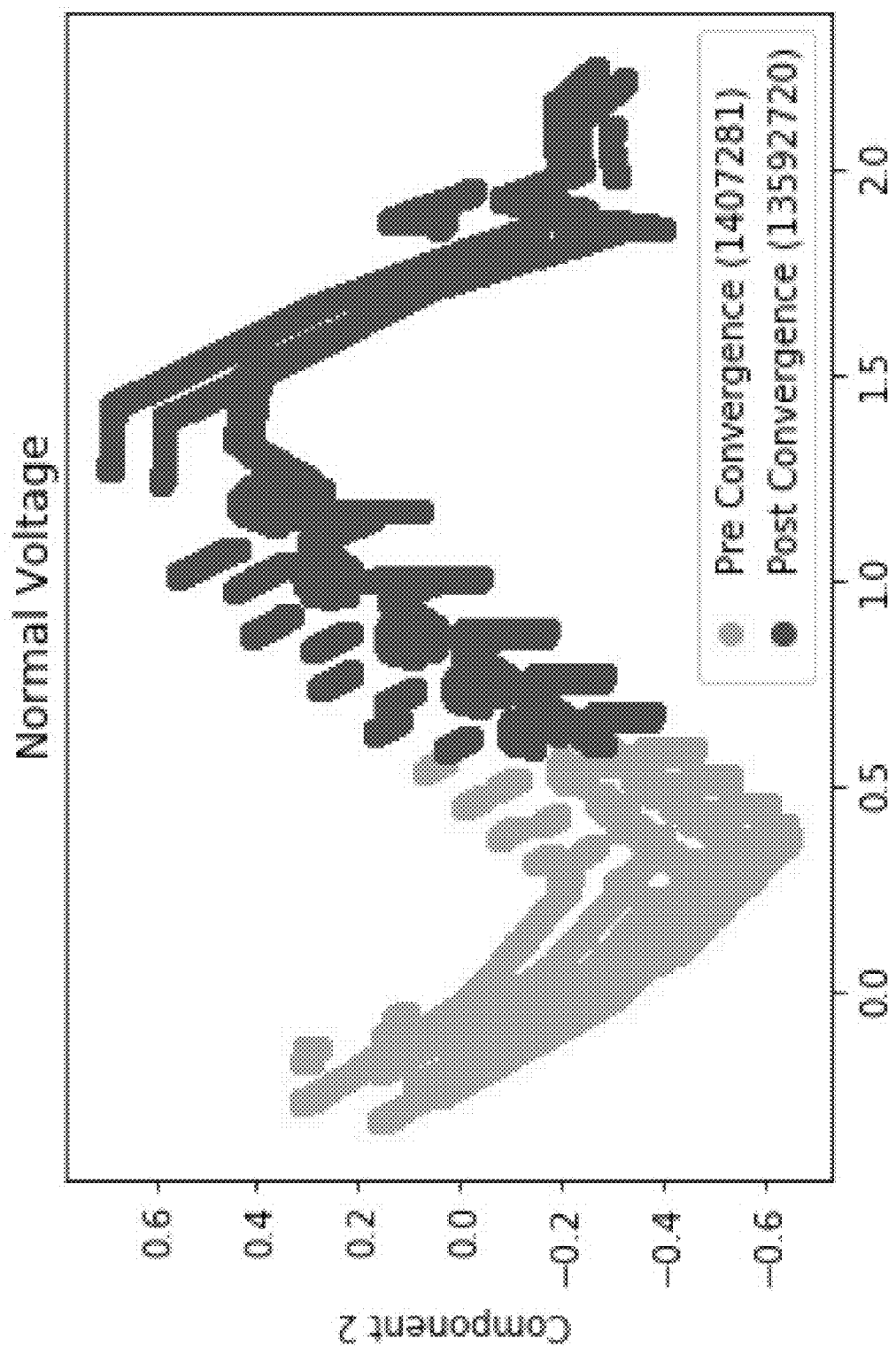
FIG. 5A is a plot of component 2 versus component 1, showing principal component analysis (PCA)-based k-means pre- and post-convergence clusters and cluster counts (for millisecond (ms) data) for voltage convergence for a normal scenario. The convergence occurs at around component 1=0.6.
Figure 5B:
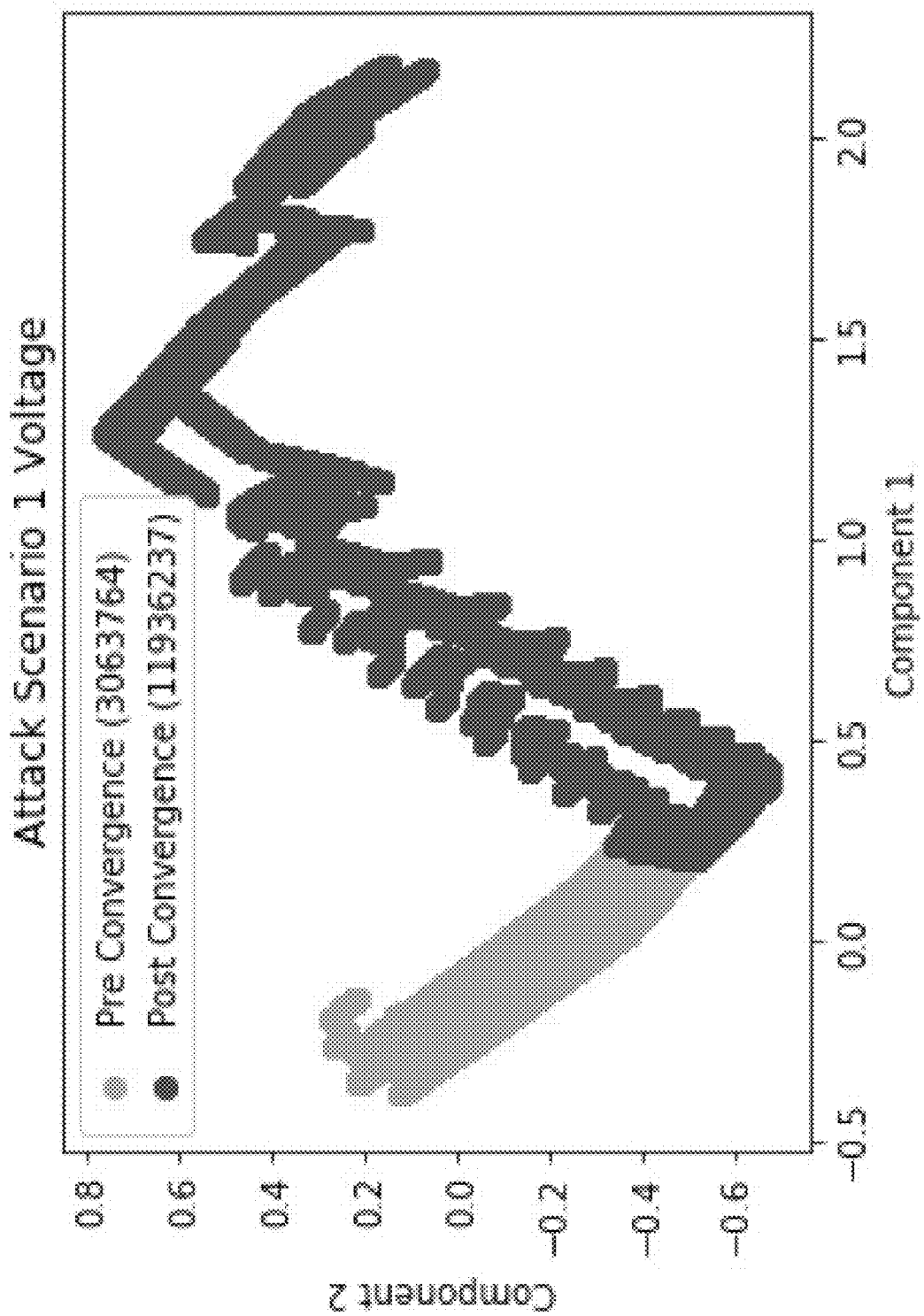
FIG. 5B is a plot of component 2 versus component 1, showing PCA-based k-means pre- and post-convergence clusters and cluster counts (for ms data) for voltage convergence for attack scenario 1. The convergence occurs at around component 1=0.2.
Figure 5C:
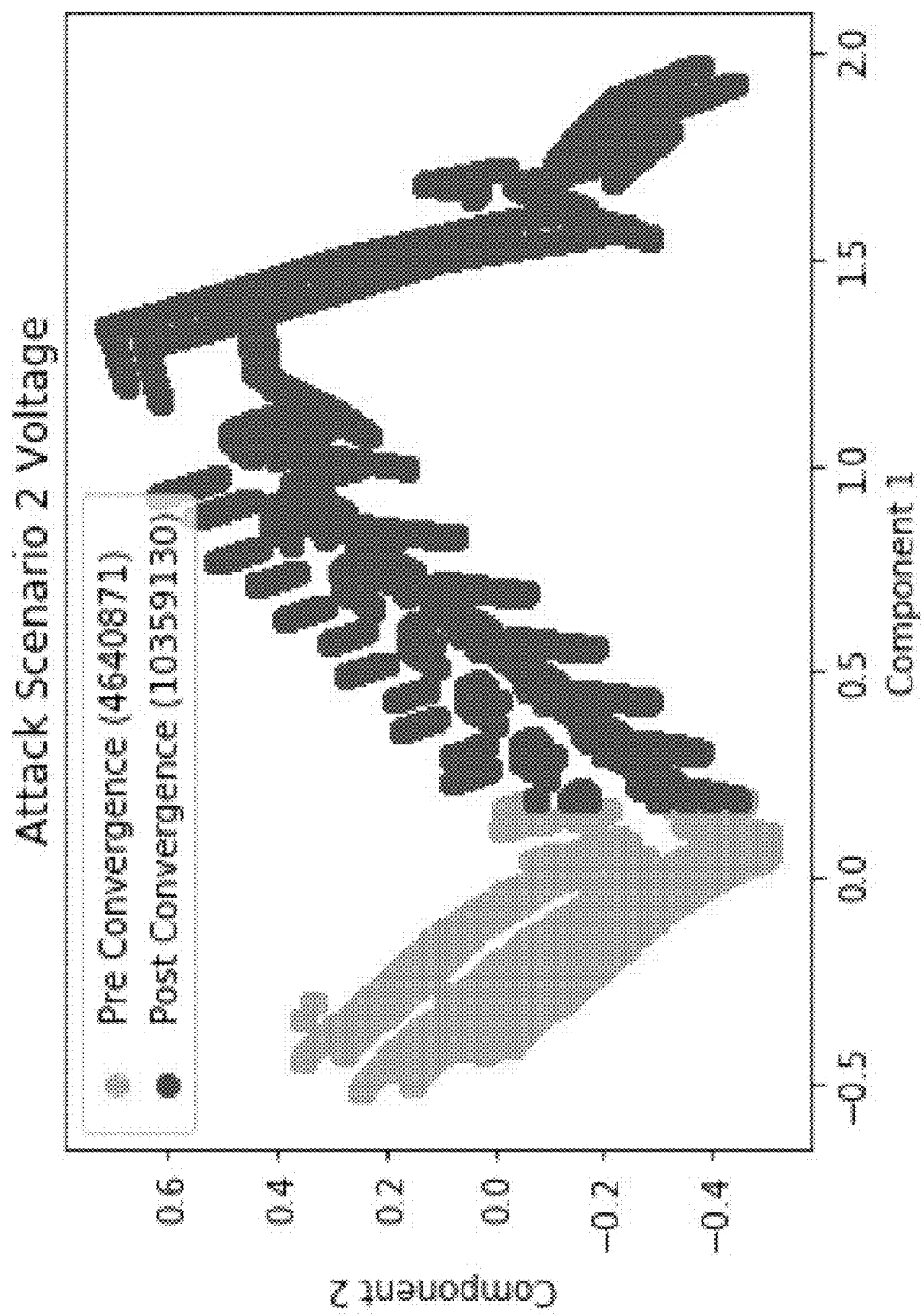
FIG. 5C is a plot of component 2 versus component 1, showing PCA-based k-means pre- and post-convergence clusters and cluster counts (for ms data) for voltage convergence for attack scenario 2. The convergence occurs at around component 1=0.2.
Figure 5D:
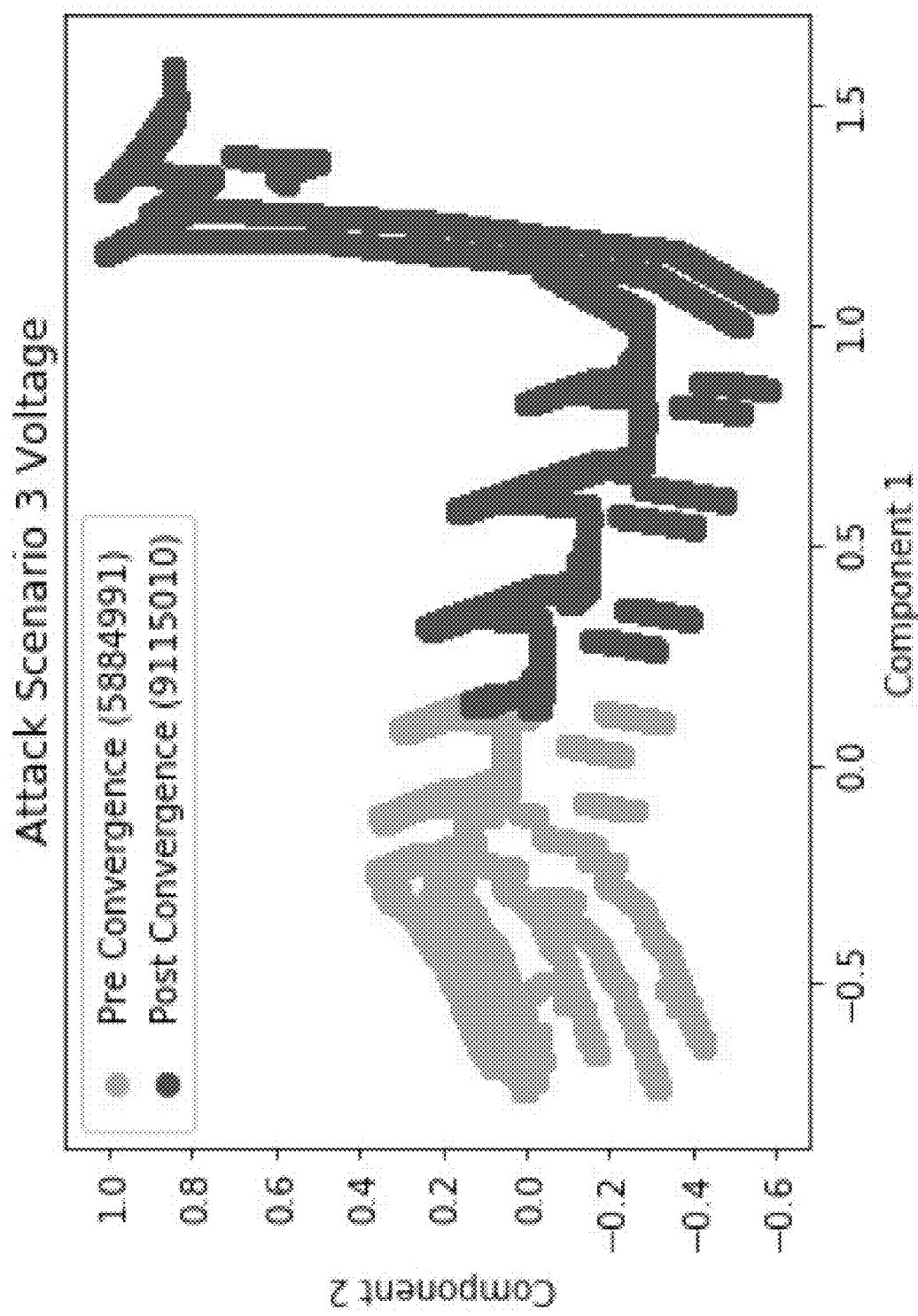
FIG. 5D is a plot of component 2 versus component 1, showing PCA-based k-means pre- and post-convergence clusters and cluster counts (for ms data) for voltage convergence for attack scenario 3. The convergence occurs at around component 1=0.2.
Figure 5E:
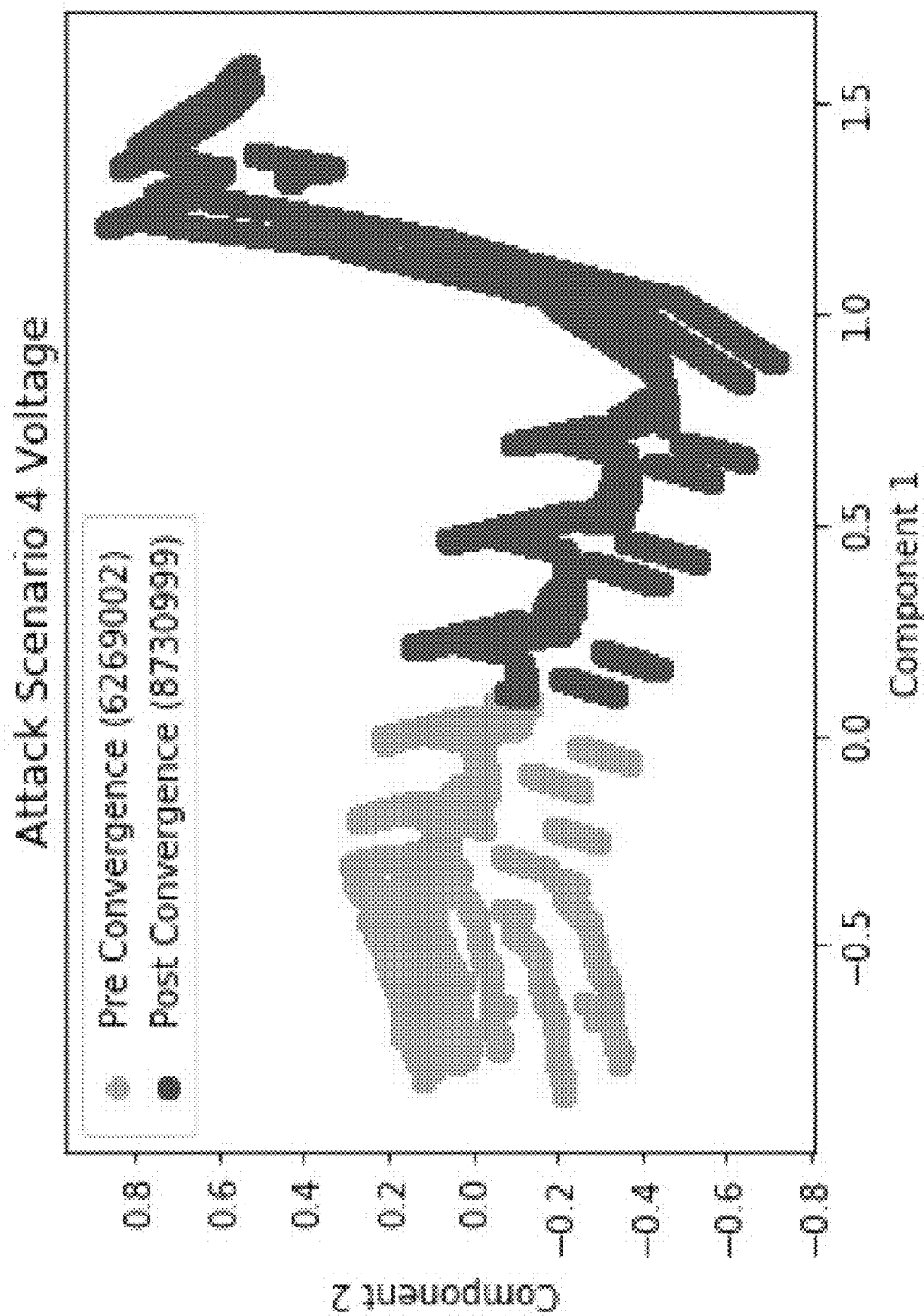
FIG. 5E is a plot of component 2 versus component 1, showing PCA-based k-means pre- and post-convergence clusters and cluster counts (for ms data) for voltage convergence for attack scenario 4. The convergence occurs at around component 1=0.05.
Figure 5F:
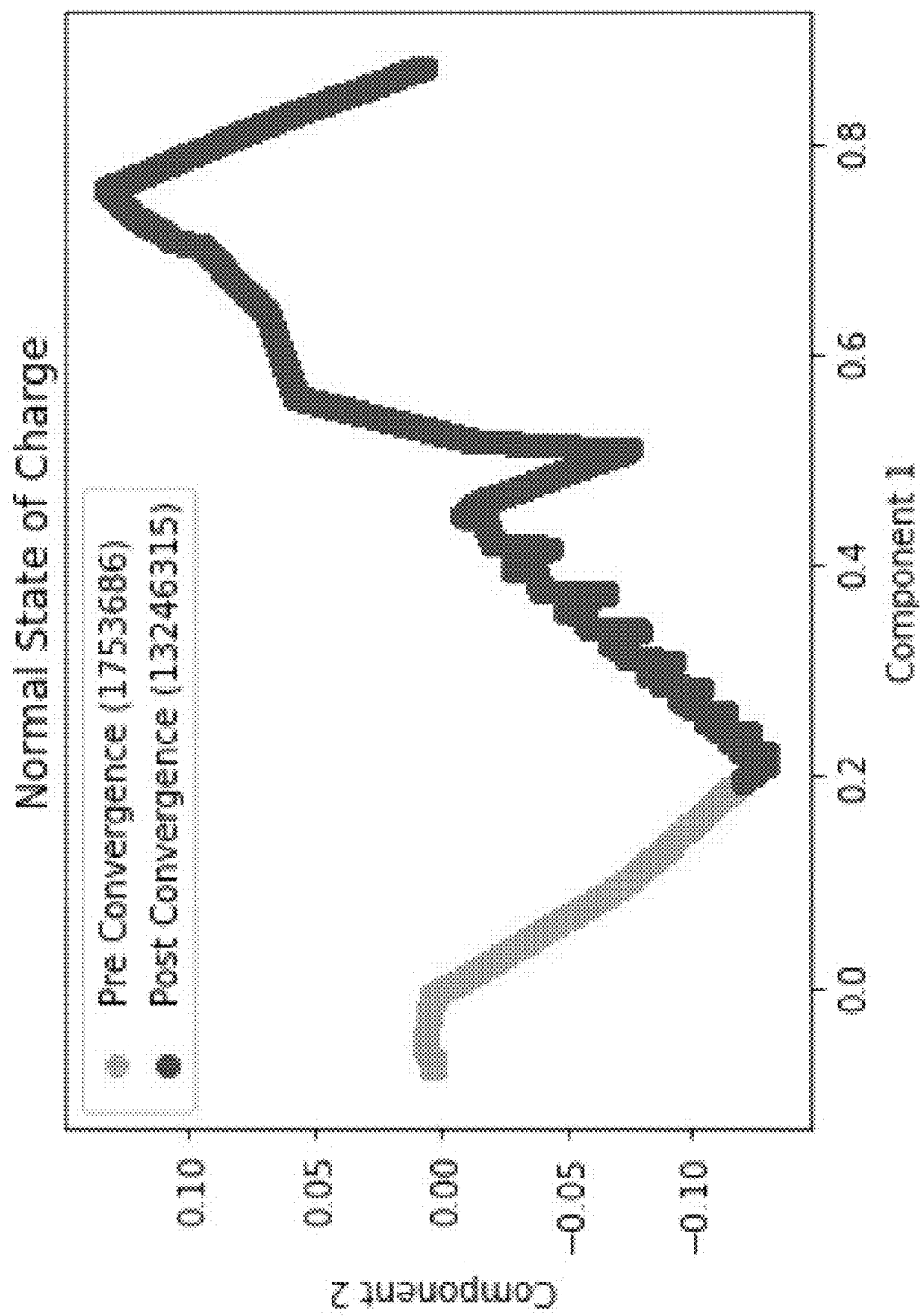
FIG. 5F is a plot of component 2 versus component 1, showing PCA-based k-means pre- and post-convergence clusters and cluster counts (for ms data) for SOC convergence for a normal scenario. The convergence occurs at around component 1=0.2.
Figure 5G:
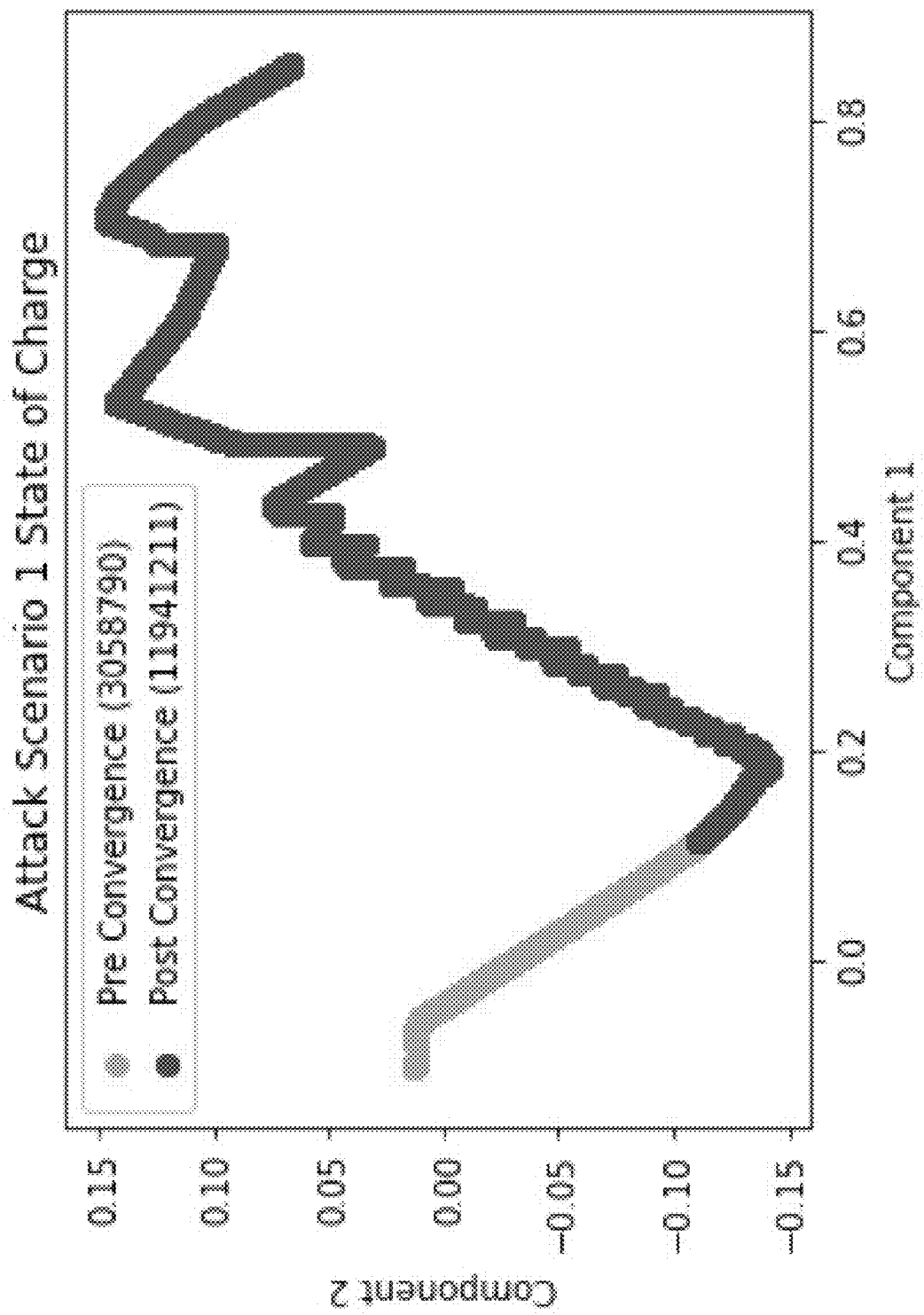
FIG. 5G is a plot of component 2 versus component 1, showing PCA-based k-means pre- and post-convergence clusters and cluster counts (for ms data) for SOC convergence for attack scenario 1. The convergence occurs at around component 1=0.1.
Figure 5H:
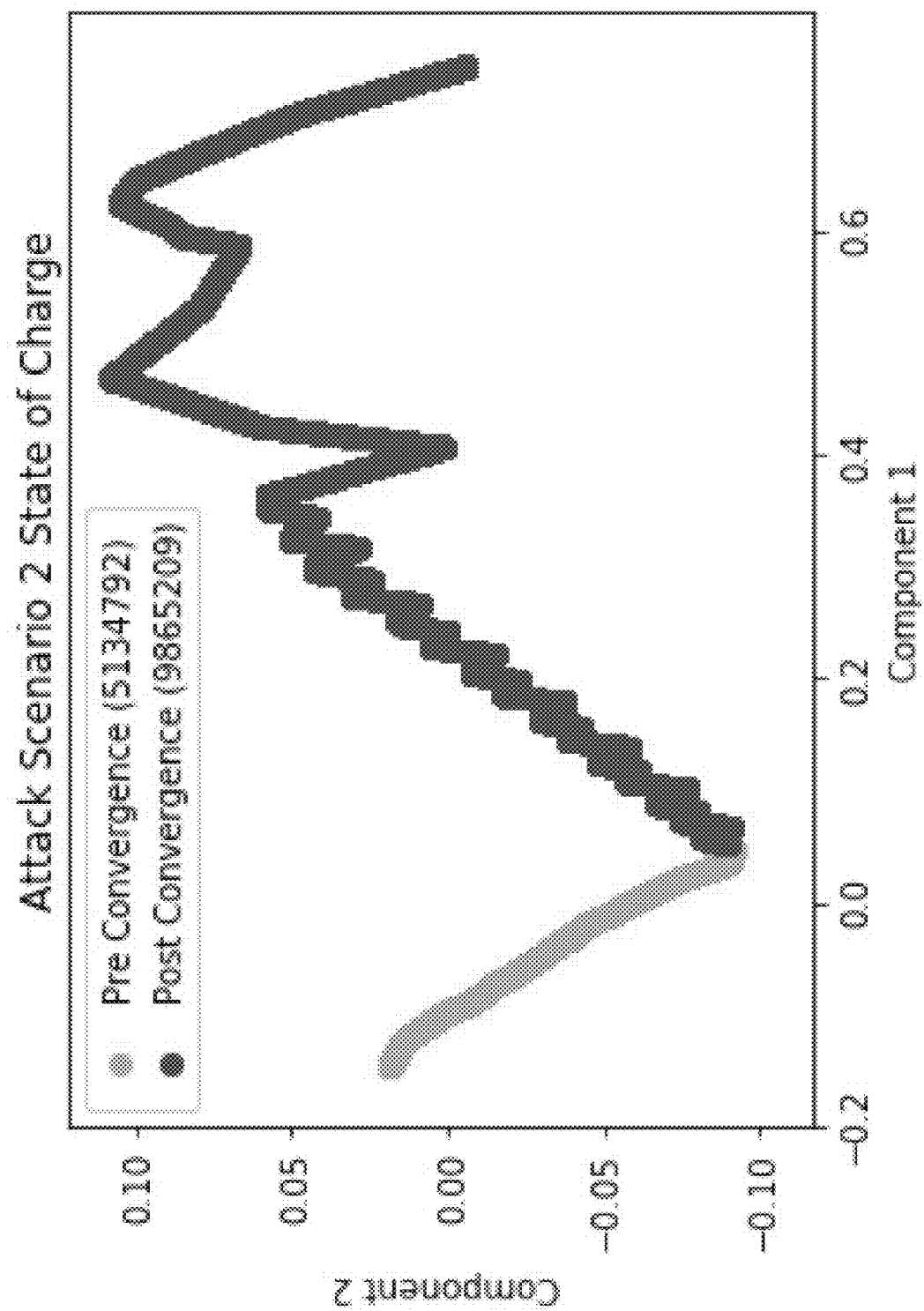
FIG. 5H is a plot of component 2 versus component 1, showing PCA-based k-means pre- and post-convergence clusters and cluster counts (for ms data) for SOC convergence for attack scenario 2. The convergence occurs at around component 1=0.03.
Figure 5I:
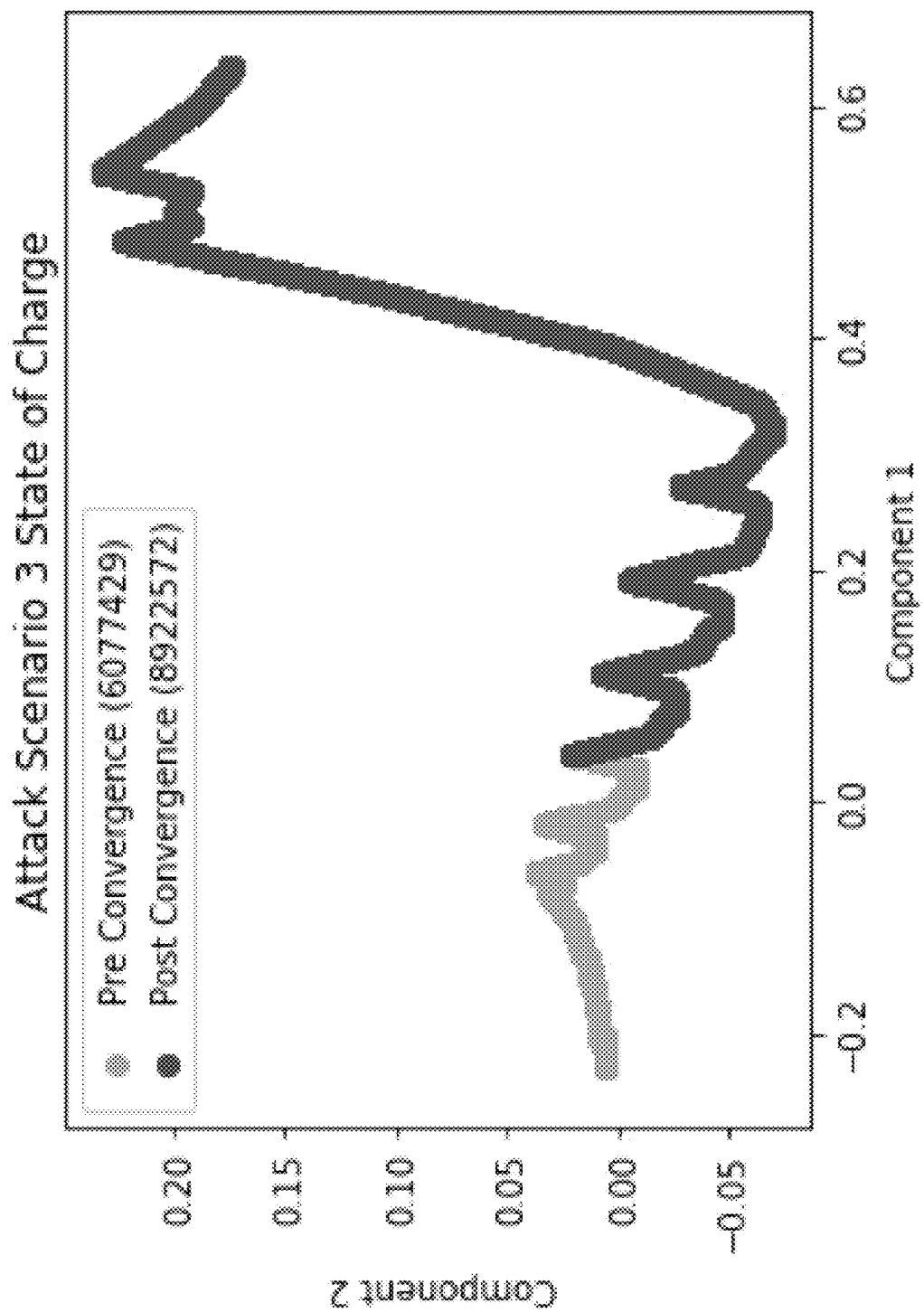
FIG. 5I is a plot of component 2 versus component 1, showing PCA-based k-means pre- and post-convergence clusters and cluster counts (for ms data) for SOC convergence for attack scenario 3. The convergence occurs at around component 1=0.03.
Figure 5J:
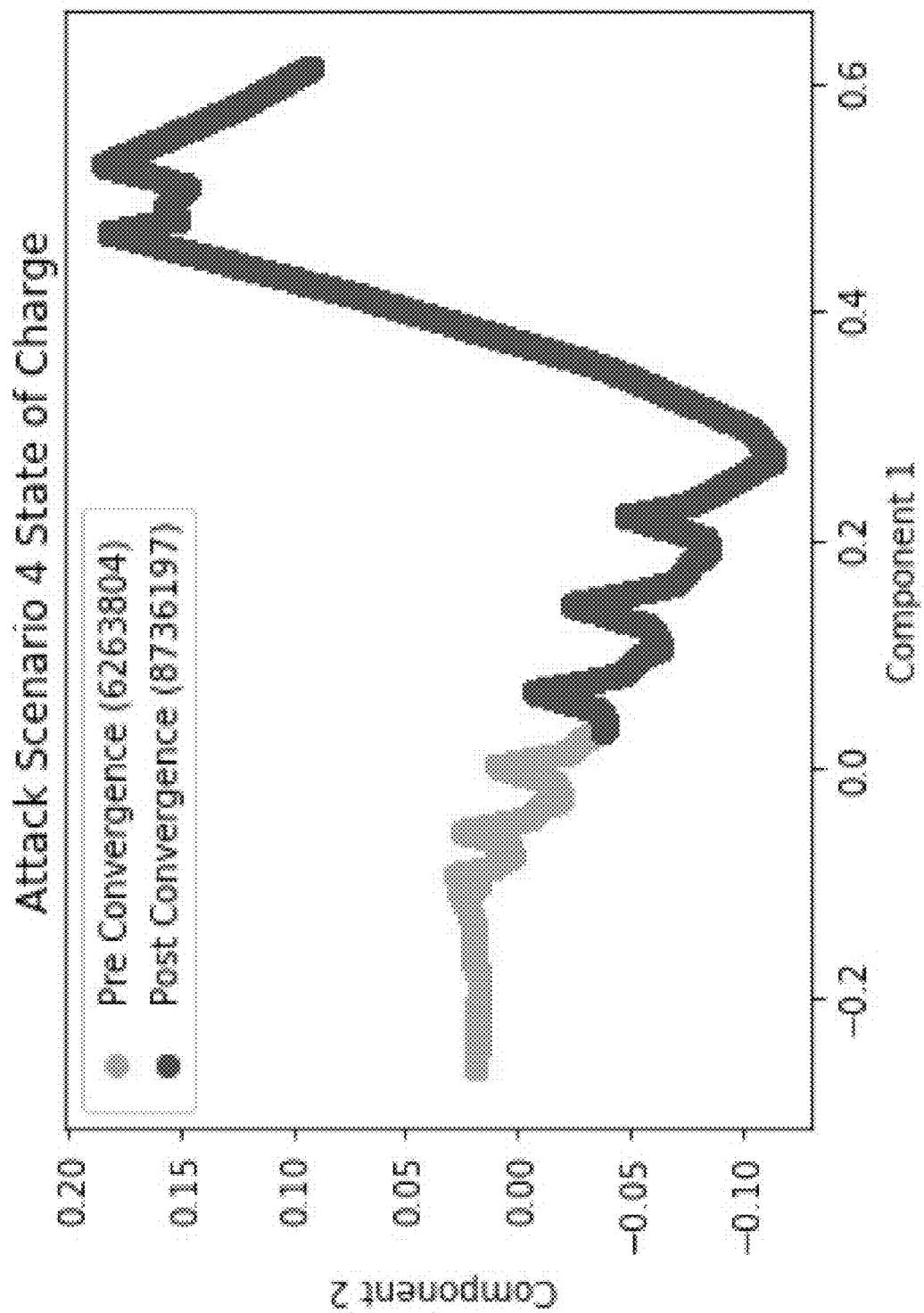
FIG. 5J is a plot of component 2 versus component 1, showing PCA-based k-means pre- and post-convergence clusters and cluster counts (for ms data) for SOC convergence for attack scenario 4. The convergence occurs at around component 1=0.01.

The elbow method, which can be used with k-means clustering, is based on the idea that an additional cluster doesn't give a better modeling of the data (see also Thorndike, Who belongs in the family?, Psychometrika, vol. 18, no. 4, pp. 267-276, 1953; which is hereby incorporated by reference herein in its entirety). The sum of squared error or within-cluster-sum-of-squares (WCSS) cost function, given by Equation (3), is a measure of variability of observation within each cluster.

$$J_k = \sum_{k=1}^{n_k} \sum_{i \in C_k} (x_i^* - \mu^*)^2 \quad (3)$$

where $\mu^* = \Sigma_{i=1}^{n} x^*_i / n_k$, k is the cluster count, $C_k$ is the $k^{th}$ cluster, and $n_k$ is the number of data points in a cluster. For k=1, $n_k$=n, and for k∈ $\mathbb{Z}^+$ and >1, sum of data points in all clusters equals n. $x_{i^*}$ is the data belonging to $C_k$ containing selected principal components. Equation (3) is computed for every cluster and the resulting WCSS is plotted against all the possible number of clusters in FIGS. 4C and 4D. The 'k' in k-means is selected to be the value where the cost function, $J_k$, drops dramatically and reaches a plateau when further increased. This method allows for pre-evaluating the total cluster count, k. k-means then uses Equation (3) to minimize $J_k$ and form k clusters using the selected principal components. These clusters are visualized in FIGS. 5A-5J and their corresponding data counts in the respective clusters are listed in the legends.

For a fixed time analysis duration, the data points count and convergence time of the pre-convergence region under normal operation remain the lowest while the post-convergence region shows the highest data points count, as shown in FIGS. 3A and 3C. Based on this, the normal $\Delta V$ setting of 0.05 volts can be injected with $\Delta e$ error values to create attack scenarios. As a result, these attacks impact the convergence times of all the cell voltages. The data points count and duration of the pre-convergence region increases as it undergoes attack scenarios 1 through 4 and consequently the data points count in the post-convergence region starts decreasing.

The PCA applied on the complete ms resolution data to identify the important features and the prominent components in FIGS. 4A and 4B shows that the CPOV are highest between the first and second components for both voltage and SOC datasets for all scenarios. Hence, the dimensionality can be reduced to 2 and these two principal components can then be fed into the k-means model for pre- and post-convergence cluster identification. Being an unsupervised technique, k-means requires identification of the number of clusters to be formed, prior to training. The elbow of the WCSS curve in FIGS. 4C and 4D suggests the optimum number of clusters to be 2 out of a total of 5 clusters for both voltage and SOC for all scenarios. Hence, k-means is trained using the first and second components from PCA to create two clusters, as shown in FIGS. 5A-5E for voltage, and FIGS. 5F-5J for SOC. These clusters thus only indicate the prominent pre-convergence and post-convergence regions of the equalization ms data and the corresponding data counts. The model fitting, principal components reduction, elbow method, and clustering model were all simulated using Python.

Embodiments of the subject invention provide a focused technical solution to the focused technical problem of accelerated degradation of battery cells due to cyber attacks. Embodiments of the subject invention improve the BMS or battery system of the battery cells by preventing or inhibiting such cyber attacks by detecting and/or identifying them before they can cause damage (e.g., any damage or significant damage) to the battery cells.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

Figure 6A:
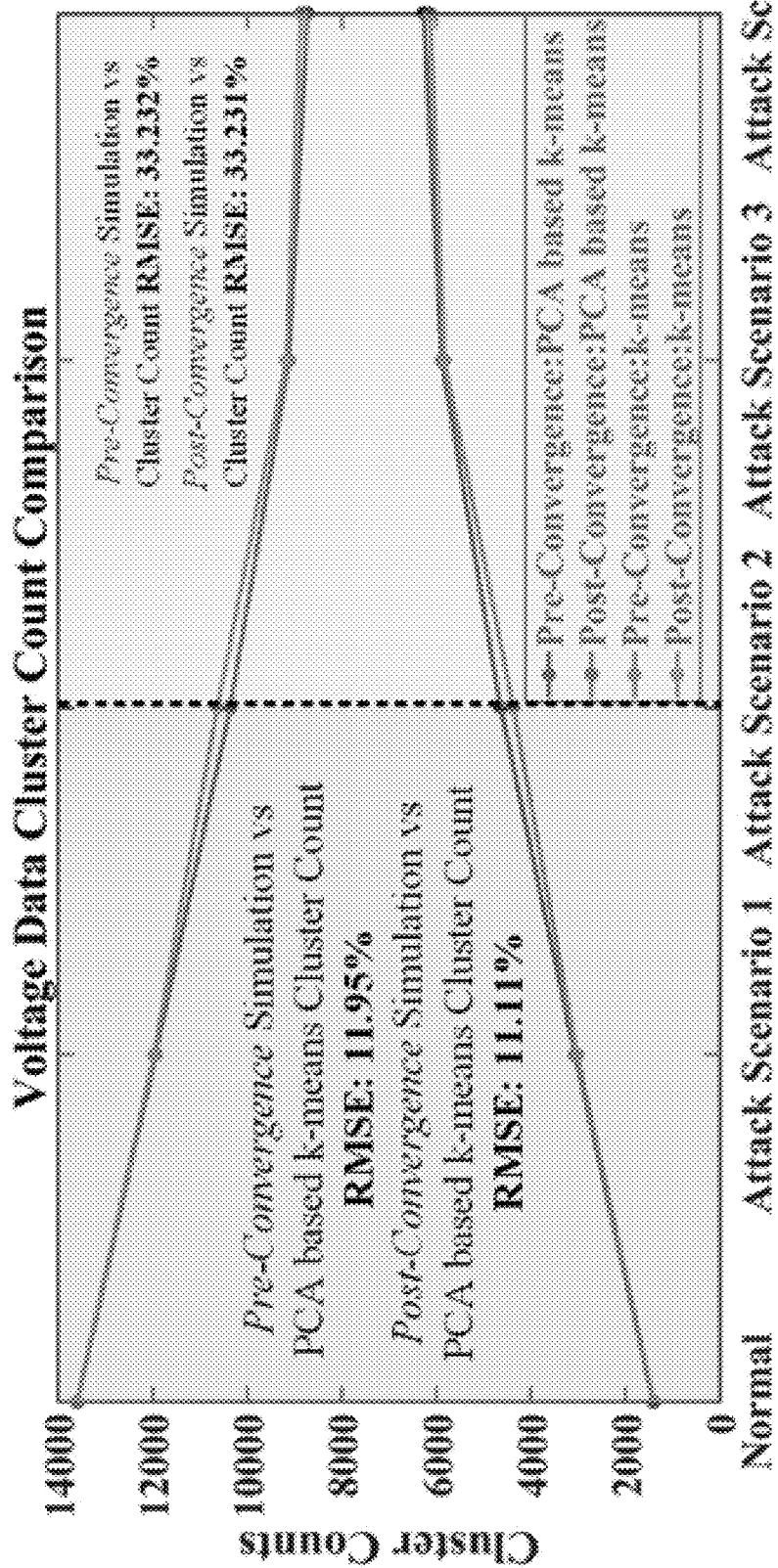
FIG. 6A is a plot of cluster count versus scenario showing cluster data point count comparison for voltage in each of the scenarios (normal, attack scenario 1, attack scenario 2, attack scenario 3, attack scenario 4). The curve with the lowest cluster count value at attack scenario 2 is for pre-convergence k-means; the curve with the second-lowest cluster count value at attack scenario 2 is for pre-convergence PCA-based k-means; the curve with the second-highest cluster count value at attack scenario 2 is for post-convergence PCA-based k-means; and the curve with the highest cluster count value at attack scenario 2 is for post-convergence k-means.
Figure 6B:
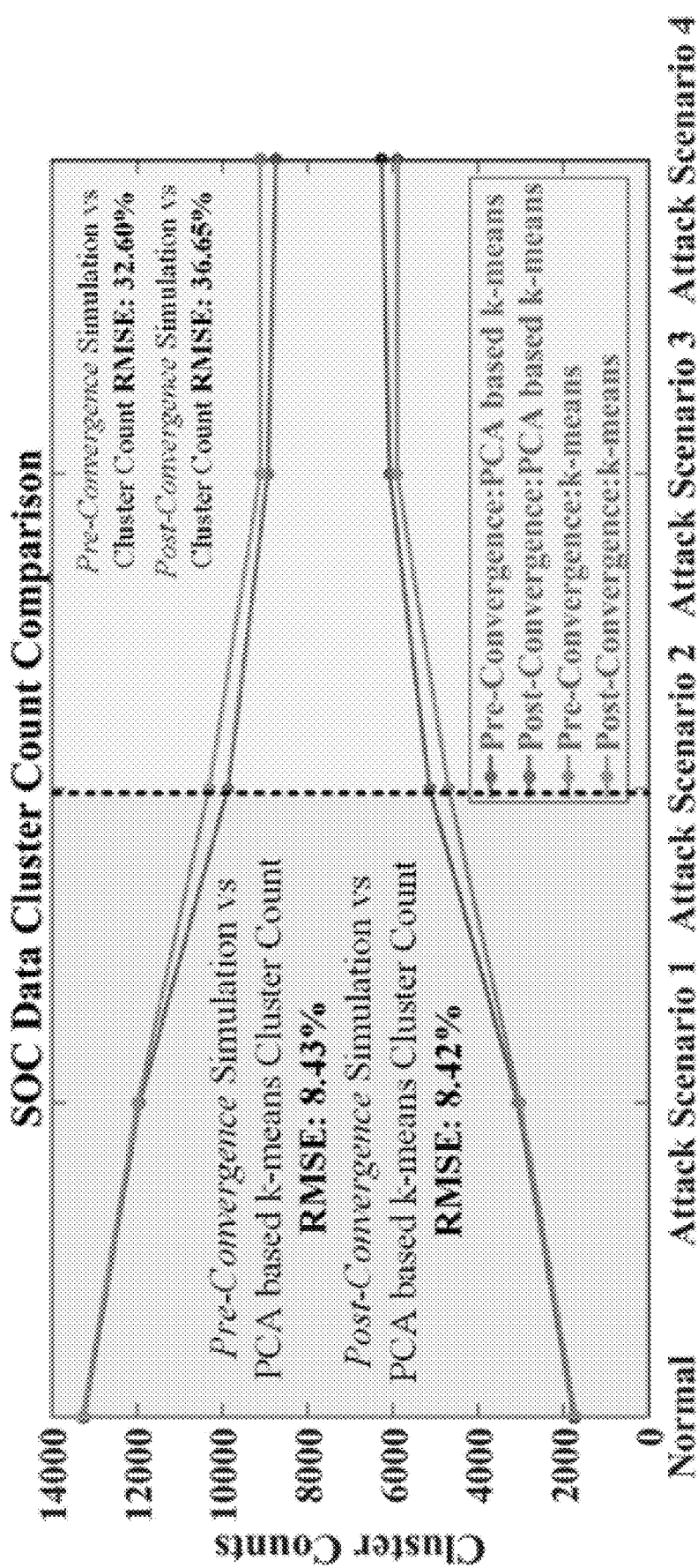
FIG. 6B is a plot of cluster count versus scenario showing cluster data point count comparison for SOC in each of the scenarios (normal, attack scenario 1, attack scenario 2, attack scenario 3, attack scenario 4). The curve with the lowest cluster count value at attack scenario 2 is for pre-convergence k-means; the curve with the second-lowest cluster count value at attack scenario 2 is for pre-convergence PCA-based k-means; the curve with the second-highest cluster count value at attack scenario 2 is for post-convergence PCA-based k-means; and the curve with the highest cluster count value at attack scenario 2 is for post-convergence k-means.

A system/method according to an embodiment of the subject invention was compared with a standalone model. The clustered data points' count for the pre-convergence region should increase and post-convergence region should decrease, with the increasing attack scenarios. Results are shown in FIGS. 6A and 6B for voltage and SOC data cluster count comparisons, respectively. Referring to FIGS. 6A and 6B, on comparison of cluster counts of PCA based k-means technique with that of a standalone k-means, the results suggest that the pre- and post-convergence clusters are more accurately identified by the system/method according to an embodiment of the subject invention due to precise cluster counts in pre-convergence plateau, and post-convergence trough plots. Specifically, the model of embodiments of the subject invention identified attacks on voltage values for $\Delta V \leq 0.2$ (until attack scenario 2) with root mean squared error (RMSE)<11.95%. The corresponding SOC cluster counts show a similar pattern with RMSE<8.43%. For $\Delta V$ values>0.2, the clustering results show a converging behavior that suggests that the data points count corresponding to the pre-convergence region exceeds the data points count in the post-convergence region, which is analogous to the pattern identified in the pre- and post-convergence simulation cluster count results.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for detecting a cyber attack on a battery management system (BMS), the system comprising:
   a processor in operable communication with the BMS; and
   a machine-readable medium in operable communication with the processor and the BMS, and having instructions stored thereon that, when executed by the processor, perform the following steps:
   turning on a switch of the BMS;
   after turning on the switch, monitoring, by the processor, data comprising a first parameter of the BMS;
   extracting, by the processor, a first dataset of the first parameter;
   after extracting the first dataset, turning off the switch of the BMS;
   performing, by the processor, a principal component analysis (PCA) based unsupervised k-means process on the first dataset to detect a first convergence period of the first dataset;
   comparing, by the processor, the first convergence period to a first expected convergence period for the first parameter based on a first buffer value of the BMS;
   if the first convergence period is greater than the first expected convergence period by more than a first preset margin amount, providing an alert that the BMS is under attack; and
   if the first convergence period is not greater than the first expected convergence period by more than the first preset margin amount, allowing the BMS to continue normal operation,
   the first parameter being voltage or state of charge (SOC).

2. The system according to claim 1, the instructions when executed further performing the following steps:
   monitoring, by the processor, a second parameter of the BMS;
   extracting, by the processor, a second dataset of the second parameter;
   performing, by the processor, the PCA based unsupervised k-means process on the second dataset to detect a second convergence period of the second dataset;
   comparing, by the processor, the second convergence period to a second expected convergence period for the first parameter based on a second buffer value of the BMS;
   if the second convergence period is greater than the second expected convergence period by more than a second preset margin amount, providing the alert that the BMS is under attack; and
   if the second convergence period is not greater than the second expected convergence period by more than the second preset margin amount, allowing the BMS to continue normal operation,
   the first parameter being voltage and the second parameter being SOC.

3. The system according to claim 2, the PCA based unsupervised k-means process comprising min-max scaling to [0,1] all data in the first dataset and all data in the second dataset.

4. The system according to claim 2, the PCA based unsupervised k-means process comprising extracting a mean and a variance of features of the first dataset and the second dataset.

5. The system according to claim 2, the first dataset having millisecond resolution and the second dataset having millisecond resolution.

6. The system according to claim 1, the instructions when executed further performing the following step:
   performing a balancing algorithm on the BMS, the balancing algorithm using a top balancing mode where battery cells are equalized at a highest safe voltage or a bottom balancing mode where the battery cells are equalized at a lowest safe voltage.

7. The system according to claim 1, the PCA based unsupervised k-means process comprising min-max scaling to [0,1] all data in the first dataset.

8. The system according to claim 1, the PCA based unsupervised k-means process comprising extracting a mean and a variance of features of the first dataset.

9. The system according to claim 1, the first dataset having millisecond resolution.

10. The system according to claim 1, comprising the BMS.

11. A method for detecting a cyber attack on a battery management system (BMS), the method comprising:
    turning on a switch of the BMS;
    after turning on the switch, monitoring data comprising a first parameter of the BMS;
    extracting a first dataset of the first parameter;
    after extracting the first dataset, turning off the switch of the BMS.
    performing a principal component analysis (PCA) based unsupervised k-means process on the first dataset to detect a first convergence period of the first dataset;
    comparing the first convergence period to a first expected convergence period for the first parameter based on a first buffer value of the BMS;
    if the first convergence period is greater than the first expected convergence period by more than a first preset margin amount, providing an alert that the BMS is under attack; and
    if the first convergence period is not greater than the first expected convergence period by more than the first preset margin amount, allowing the BMS to continue normal operation,
    the first parameter being voltage or state of charge (SOC).

12. The method according to claim 11, further comprising:
    monitoring a second parameter of the BMS;
    extracting a second dataset of the second parameter;
    performing the PCA based unsupervised k-means process on the second dataset to detect a second convergence period of the second dataset;
    comparing the second convergence period to a second expected convergence period for the first parameter based on a second buffer value of the BMS;
    if the second convergence period is greater than the second expected convergence period by more than a second preset margin amount, providing the alert that the BMS is under attack; and
    if the second convergence period is not greater than the second expected convergence period by more than the second preset margin amount, allowing the BMS to continue normal operation,
    the first parameter being voltage and the second parameter being SOC.

13. The method according to claim 12, the PCA based unsupervised k-means process comprising min-max scaling to [0,1] all data in the first dataset and all data in the second dataset.

14. The method according to claim 12, the PCA based unsupervised k-means process comprising extracting a mean and a variance of features of the first dataset and the second dataset.

15. The method according to claim 12, the first dataset having millisecond resolution and the second dataset having millisecond resolution.

16. The method according to claim 11, further comprising:
    performing a balancing algorithm on the BMS, the balancing algorithm using a top balancing mode where battery cells are equalized at a highest safe voltage or a bottom balancing mode where the battery cells are equalized at a lowest safe voltage.

17. The method according to claim 11, the PCA based unsupervised k-means process comprising min-max scaling to [0,1] all data in the first dataset.

18. The method according to claim 11, the PCA based unsupervised k-means process comprising extracting a mean and a variance of features of the first dataset.

19. The method according to claim 11, the first dataset having millisecond resolution.

20. A system for detecting a cyber attack on a battery management system (BMS), the system comprising:
    the BMS;
    a processor in operable communication with the BMS; and
    a machine-readable medium in operable communication with the processor and the BMS, and having instructions stored thereon that, when executed by the processor, perform the following steps:
        performing a balancing algorithm on the BMS, the balancing algorithm using a top balancing mode where battery cells are equalized at a highest safe voltage or a bottom balancing mode where the battery cells are equalized at a lowest safe voltage;
        turning on a switch of the BMS;
        after turning on the switch, monitoring, by the processor, data comprising a first parameter of the BMS and a second parameter of the BMS;
        extracting, by the processor, a first dataset of the first parameter and a second dataset of the second parameter;
        after extracting the first dataset, turning off the switch of the BMS;
        performing, by the processor, a principal component analysis (PCA) based unsupervised k-means process on the first dataset to detect a first convergence period of the first dataset and on the second dataset to detect a second convergence period of the second dataset;
        comparing, by the processor, the first convergence period to a first expected convergence period for the first parameter based on a first buffer value of the BMS;
        comparing, by the processor, the second convergence period to a second expected convergence period for the second parameter based on a second buffer value of the BMS;
        if the first convergence period is greater than the first expected convergence period by more than a first preset margin amount, providing an alert that the BMS is under attack;
        if the second convergence period is greater than the second expected convergence period by more than a second preset margin amount, providing the alert that the BMS is under attack; and
        if the first convergence period is not greater than the first expected convergence period by more than the first preset margin amount and the second convergence period is not greater than the second expected convergence period by more than the second preset margin amount, allowing the BMS to continue normal operation,
    the first parameter being voltage,
    the second parameter being state of charge (SOC), the PCA based unsupervised k-means process comprising min-max scaling to [0,1] all data in the first dataset and all data in the second dataset, the PCA based unsupervised k-means process comprising extracting a mean and a variance of features of the first dataset and the second dataset, and the first dataset having millisecond resolution and the second dataset having millisecond resolution.

\* \* \* \* \*